(12) United States Patent
Chendamarai Kannan et al.

(10) Patent No.: US 11,799,594 B2
(45) Date of Patent: Oct. 24, 2023

(54) METHODS AND APPARATUS FOR TRANSMITTING A RESET NEGATIVE ACKNOWLEDGEMENT

(71) Applicant: QUALCOMM Incorporated, San Diego, CA (US)

(72) Inventors: Arumugam Chendamarai Kannan, San Diego, CA (US); Xiaoxia Zhang, San Diego, CA (US); Jing Sun, San Diego, CA (US); Srinivas Yerramalli, Hyderabad (IN); Vinay Chande, San Diego, CA (US); Tao Luo, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 305 days.

(21) Appl. No.: 17/353,141

(22) Filed: Jun. 21, 2021

(65) Prior Publication Data

US 2021/0399842 A1    Dec. 23, 2021

Related U.S. Application Data

(60) Provisional application No. 63/042,431, filed on Jun. 22, 2020.

(51) Int. Cl.
*H04L 1/1812* (2023.01)
*H04W 72/1263* (2023.01)
(Continued)

(52) U.S. Cl.
CPC .......... *H04L 1/1819* (2013.01); *H04L 1/1835* (2013.01); *H04L 1/1896* (2013.01); *H04W 72/1263* (2013.01)

(58) Field of Classification Search
None
See application file for complete search history.

(56) References Cited

U.S. PATENT DOCUMENTS

| 2003/0118031 A1 | 6/2003 | Classon et al. |
| 2009/0086657 A1 | 4/2009 | Alpert et al. |

(Continued)

OTHER PUBLICATIONS

International Search Report and Written Opinion—PCT/US2021/038391—ISA/EPO—dated Oct. 6, 2021.

*Primary Examiner* — Marcus Smith
(74) *Attorney, Agent, or Firm* — Arent Fox LLP/Qualcomm Incorporated

(57) ABSTRACT

Aspects of the present disclosure include methods, apparatuses, and computer readable media for receiving first downlink information, failing to decode a first portion of the first downlink information, transmitting, to a base station (BS), a first response including a negative acknowledgement (NACK) indicating a first decoding failure associated with the first portion of the first downlink information, receiving second downlink information, failing to decode a first portion of the second downlink information, detecting a hybrid automatic repeat request (HARQ) buffer unavailability, determining to discard NACK information associated with the NACK, resetting at least a portion of a HARQ buffer, in response to detecting the HARQ buffer unavailability, by discarding NACK information associated with the NACK, generating a reset NACK indicating the HARQ buffer reset and indicating the NACK information being discarded, and transmitting a second response including the reset NACK to the BS.

30 Claims, 9 Drawing Sheets

(51) Int. Cl.
    *H04L 1/1867*    (2023.01)
    *H04L 1/1829*    (2023.01)

(56) References Cited

U.S. PATENT DOCUMENTS

2017/0373802 A1* 12/2017 Bergström ............ H04L 1/0027
2019/0280820 A1*  9/2019 Kim .................... H04L 5/0053
2020/0099474 A1*  3/2020 Wikström ............ H04L 1/0068
2021/0367714 A1* 11/2021 Fujimori .............. H04L 1/1896

* cited by examiner

METHODS AND APPARATUS FOR TRANSMITTING A RESET NEGATIVE ACKNOWLEDGEMENT

CROSS REFERENCE TO RELATED APPLICATIONS

The current application claims priority to, and the benefit of, U.S. Provisional Application No. 63/042,431 filed on Jun. 22, 2020, entitled "Methods and Apparatus for Transmitting A Reset Negative Acknowledgement," the contents of which are hereby incorporated by reference in their entireties.

BACKGROUND

Aspects of the present disclosure relate generally to wireless communications, and more particularly, to apparatuses and methods for transmitting a reset negative acknowledgement.

Wireless communication networks are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which may be referred to as new radio (NR)) is envisaged to expand and support diverse usage scenarios and applications with respect to current mobile network generations. In an aspect, 5G communications technology may include: enhanced mobile broadband addressing human-centric use cases for access to multimedia content, services and data; ultra-reliable-low latency communications (URLLC) with certain specifications for latency and reliability; and massive machine type communications, which may allow a very large number of connected devices and transmission of a relatively low volume of non-delay-sensitive information. As the demand for mobile broadband access continues to increase, however, further improvements in NR communications technology and beyond may be desired.

In a wireless communication network, as the frequency increases, the slot duration may become smaller accordingly. As a result, a user equipment (UE) may require more computational resource to process, generate, and/or transmit acknowledgements (ACKs) and/or negative acknowledgement (NACKs) of associated data (transmitted by the base station (BS)) within a certain time frame. Therefore, new signaling associated with ACK and NACK may be desirable for higher frequency communication networks.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Aspects of the present disclosure include methods by a user equipment (UE) for receiving first downlink information, failing to decode a first portion of the first downlink information, transmitting, to a base station (BS), a first response including a negative acknowledgement (NACK) indicating a first decoding failure associated with the first portion of the first downlink information, receiving second downlink information, failing to decode a first portion of the second downlink information, detecting a hybrid automatic repeat request (HARQ) buffer unavailability, resetting at least a portion of a HARQ buffer, in response to detecting the HARQ buffer unavailability, by discarding NACK information associated with the NACK, generating a reset NACK indicating the HARQ buffer reset and indicating the NACK information being discarded, and transmitting a second response including the reset NACK to the BS.

Other aspects of the present disclosure include a user equipment (UE) having a memory comprising instructions, a transceiver, and one or more processors operatively coupled with the memory and the transceiver, the one or more processors configured to execute instructions in the memory to receive first downlink information, fail to decode a first portion of the first downlink information, transmit to a base station (BS), a first response including a negative acknowledgement (NACK) indicating a first decoding failure associated with the first portion of the first downlink information, receive second downlink information, fail to decode a first portion of the second downlink information, detect a hybrid automatic repeat request (HARQ) buffer unavailability, reset at least a portion of a HARQ buffer, in response to detecting the HARQ buffer unavailability, by discarding NACK information associated with the NACK, generate a reset NACK indicating the HARQ buffer reset and indicating the NACK information being discarded, and transmit a second response including the reset NACK to the BS.

An aspect of the present disclosure includes a user equipment (UE) including means for receiving first downlink information, means for failing to decode a first portion of the first downlink information, means for transmitting, to a base station (BS), a first response including a negative acknowledgement (NACK) indicating a first decoding failure associated with the first portion of the first downlink information, means for receiving second downlink information, means for failing to decode a first portion of the second downlink information, detecting a hybrid automatic repeat request (HARQ) buffer unavailability, means for resetting at least a portion of a HARQ buffer, in response to detecting the HARQ buffer unavailability, by discarding NACK information associated with the NACK, means for generating a reset NACK indicating the HARQ buffer reset and indicating the NACK information being discarded, and means for transmitting a second response including the reset NACK to the BS.

Some aspects of the present disclosure include non-transitory computer readable media having instructions stored therein that, when executed by one or more processors of a user equipment (UE), cause the one or more processors to receive first downlink information, fail to decode a first portion of the first downlink information, transmit to a base station (BS), a first response including a negative acknowledgement (NACK) indicating a first decoding failure associated with the first portion of the first downlink information, receive second downlink information, fail to decode a first portion of the second downlink information, detect a hybrid automatic repeat request (HARQ) buffer unavailability, reset at least a portion of a HARQ buffer, in response to detecting the HARQ buffer unavailability, by discarding NACK information associated with the NACK, generate a reset NACK indicating the HARQ buffer reset and indicating the NACK information being discarded, and transmit a second response including the reset NACK to the BS.

Aspects of the present disclosure include methods by a base station (BS) for transmitting, to a user equipment (UE), first downlink information, receiving, from the UE in response to transmitting the downlink information, a first response including a negative acknowledgement (NACK) indicating a first decoding failure associated with a first portion of the first downlink information, transmitting, to the UE, second downlink information, and receiving, from the UE in response to transmitting the second downlink information, a second response including a reset NACK indicating a hybrid automatic repeat request (HARQ) buffer reset and the UE discarding NACK information associated with the NACK, wherein the HARQ buffer reset is associated with a HARQ buffer unavailability.

Other aspects of the present disclosure include a user equipment (UE) having a memory comprising instructions, a transceiver, and one or more processors operatively coupled with the memory and the transceiver, the one or more processors configured to execute instructions in the memory to transmit, to a user equipment (UE), first downlink information, receive, from the UE in response to transmitting the downlink information, a first response including a negative acknowledgement (NACK) indicating a first decoding failure associated with a first portion of the first downlink information, transmit, to the UE, second downlink information, and receive, from the UE in response to transmitting the second downlink information, a second response including a reset NACK indicating a hybrid automatic repeat request (HARQ) buffer reset and the UE discarding NACK information associated with the NACK, wherein the HARQ buffer reset is associated with a HARQ buffer unavailability.

An aspect of the present disclosure includes a user equipment (UE) including means for transmitting, to a user equipment (UE), first downlink information, means for receiving, from the UE in response to transmitting the downlink information, a first response including a negative acknowledgement (NACK) indicating a first decoding failure associated with a first portion of the first downlink information, means for transmitting, to the UE, second downlink information, and means for receiving, from the UE in response to transmitting the second downlink information, a second response including a reset NACK indicating a hybrid automatic repeat request (HARQ) buffer reset and the UE discarding NACK information associated with the NACK, wherein the HARQ buffer reset is associated with a HARQ buffer unavailability.

Some aspects of the present disclosure include non-transitory computer readable media having instructions stored therein that, when executed by one or more processors of a user equipment (UE), cause the one or more processors to transmit, to a user equipment (UE), first downlink information, receive, from the UE in response to transmitting the downlink information, a first response including a negative acknowledgement (NACK) indicating a first decoding failure associated with a first portion of the first downlink information, transmit, to the UE, second downlink information, and receive, from the UE in response to transmitting the second downlink information, a second response including a reset NACK indicating a hybrid automatic repeat request (HARQ) buffer reset and the UE discarding NACK information associated with the NACK, wherein the HARQ buffer reset is associated with a HARQ buffer unavailability.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
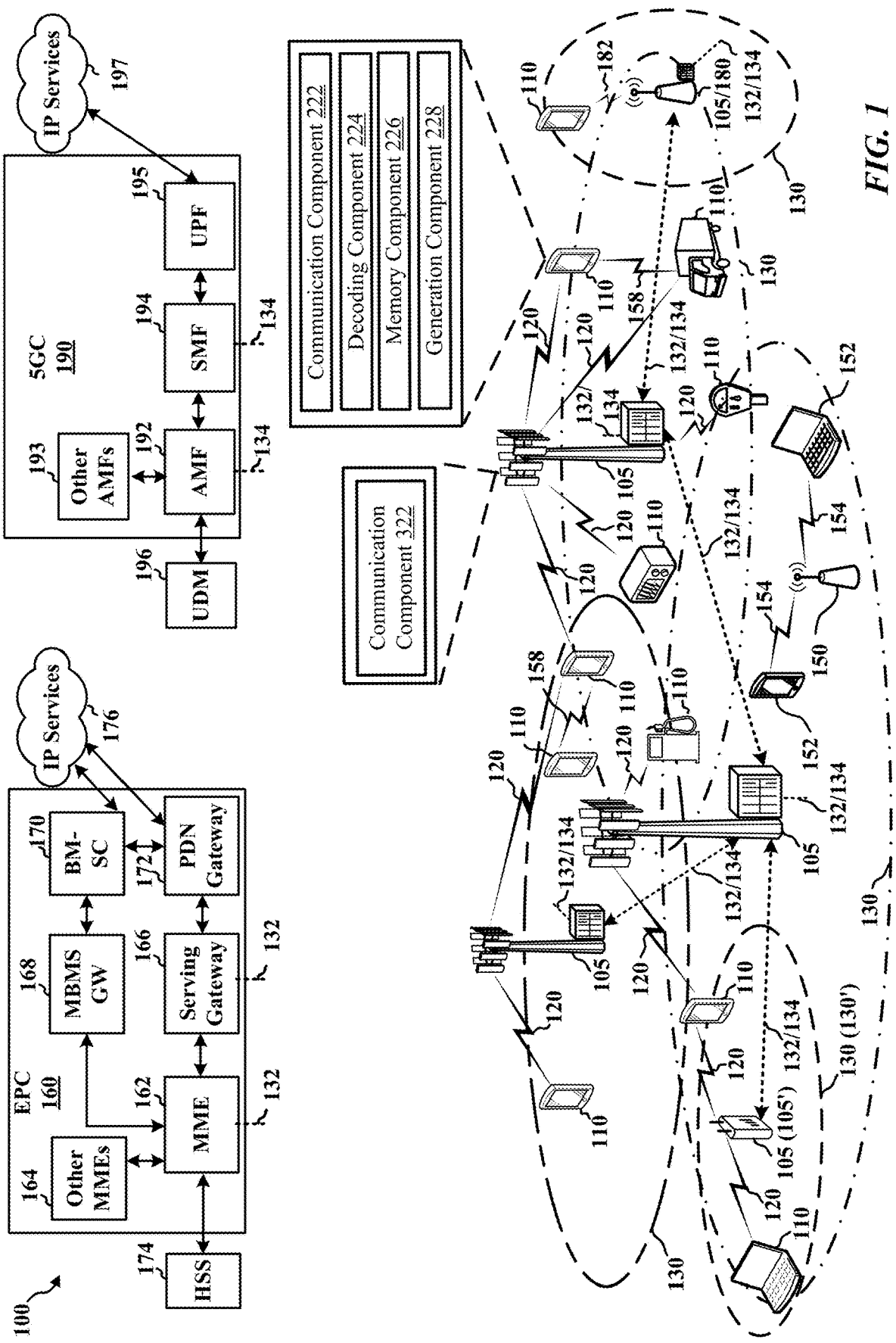
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that may be accessed by a computer. By way of example, and not limitation, such computer-readable media may comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that may be used to store computer executable code in the form of instructions or data structures that may be accessed by a computer.

In one implementation, the UE may determine that the hybrid automatic repeat request (HARQ) buffer is unavailable (e.g., memory full). In response, the UE may discard portions of the content in the HARQ buffer to make room for additional logarithmic likelihood ratios (LLRs). The UE may transmit a reset negative acknowledgement (NACK) to the BS indicating that the HARQ buffer has been reset and/or certain LLRs have been deleted.

FIG. 1 is a diagram illustrating an example of a wireless communications system and an access network 100. The wireless communications system (also referred to as a wireless wide area network (WWAN)) includes at least one BS 105, UEs 110, an Evolved Packet Core (EPC) 160, and a 5G Core (5GC) 190. The BS 105 may include macro cells (high power cellular base station) and/or small cells (low power cellular base station). The macro cells include base stations. The small cells include femtocells, picocells, and microcells. In one implementation, the UE 110 may include a communication component 222 configured to communicate with the BS 105 via a cellular network, a Wi-Fi network, or other wireless and wired networks. The UE 110 may include a decoding component 224 for decoding information received by the UE 110. The UE 110 may include a memory component 226 that manages one or more memories and/or buffers of the UE 110. The UE 110 may include a generation component 228 that generates acknowledgements (ACKs) and/or negative acknowledgements (NACKs). In some implementations, the communication component 222, the decoding component 224, the memory component 226, and/or the generation component 228 may be implemented using hardware, software, or a combination of hardware and software. In some implementations, the BS 105 may include a communication component 322 configured to communicate with the UE 110. In some implementations, the communication component 322 may be implemented using hardware, software, or a combination of hardware and software.

A BS 105 configured for 4G Long-Term Evolution (LTE) (collectively referred to as Evolved Universal Mobile Telecommunications System (UMTS) Terrestrial Radio Access Network (E-UTRAN)) may interface with the EPC 160 through backhaul links interfaces 132 (e.g., S1, X2, Internet Protocol (IP), or flex interfaces). A BS 105 configured for 5G NR (collectively referred to as Next Generation RAN (NG-RAN)) may interface with 5GC 190 through backhaul links interfaces 134 (e.g., S1, X2, Internet Protocol (IP), or flex interface). In addition to other functions, the BS 105 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The BS 105 may communicate directly or indirectly (e.g., through the EPC 160 or 5GC 190) with each other over the backhaul links interfaces 134. The backhaul links 132, 134 may be wired or wireless.

The BS 105 may wirelessly communicate with the UEs 110. Each of the BS 105 may provide communication coverage for a respective geographic coverage area 130. There may be overlapping geographic coverage areas 130. For example, the small cell 105' may have a coverage area 130' that overlaps the coverage area 130 of one or more macro BS 105. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the BS 105 and the UEs 110 may include uplink (UL) (also referred to as reverse link) transmissions from a UE 110 to a BS 105 and/or downlink (DL) (also referred to as forward link) transmissions from a BS 105 to a UE 110. The communication links 120 may use multiple-input and multiple-output (MIMO) antenna technology, including spatial multiplexing, beamforming, and/or transmit diversity. The communication links may be through one or more carriers. The BS 105/UEs 110 may use spectrum up to Y MHz (e.g., 5, 10, 15, 20, 100, 400, etc. MHz) bandwidth per carrier allocated in a carrier aggregation of up to a total of $Y_x$ MHz (x component carriers) used for transmission in each direction. The carriers may or may not be adjacent to each other. Allocation of carriers may be asymmetric with respect to DL and UL (e.g., more or less carriers may be allocated for DL than for UL).

The component carriers may include a primary component carrier and one or more secondary component carriers. A primary component carrier may be referred to as a primary cell (PCell) and a secondary component carrier may be referred to as a secondary cell (SCell).

Certain UEs 110 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 105' may operate in a licensed and/or an unlicensed frequency spectrum. When operating in an unlicensed frequency spectrum, the small cell 105' may employ NR and use the same 5 GHz unlicensed frequency spectrum as used by the Wi-Fi AP 150. The small cell 105', employing NR in an unlicensed frequency spectrum, may boost coverage to and/or increase capacity of the access network.

ABS 105, whether a small cell 105' or a large cell (e.g., macro base station), may include an eNB, gNodeB (gNB), or other type of base station. Some base stations, such as gNB 180 may operate in one or more frequency bands within the electromagnetic spectrum. The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW/near mmW radio frequency (RF) band has extremely high path loss and a short range. The mmW base station 180 may utilize beamforming 182 with the UE 110 to compensate for the path loss and short range.

The EPC 160 may include a Mobility Management Entity (MIME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 110 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a packet switched (PS) Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the BS 105 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 110 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The BS 105 may also be referred to as a gNB, Node B, evolved Node B (eNB), an access point, a base transceiver station, a radio base station, an access point, an access node, a radio transceiver, a NodeB, eNodeB (eNB), gNB, Home NodeB, a Home eNodeB, a relay, a transceiver function, a basic service set (BSS), an extended service set (ESS), a transmit reception point (TRP), or some other suitable terminology. The BS 105 provides an access point to the EPC 160 or 5GC 190 for a UE 110. Examples of UEs 110 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 110 may be referred to as IoT devices (e.g., parking meter, gas pump, toaster, vehicles, heart monitor, etc.). The UE 110 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
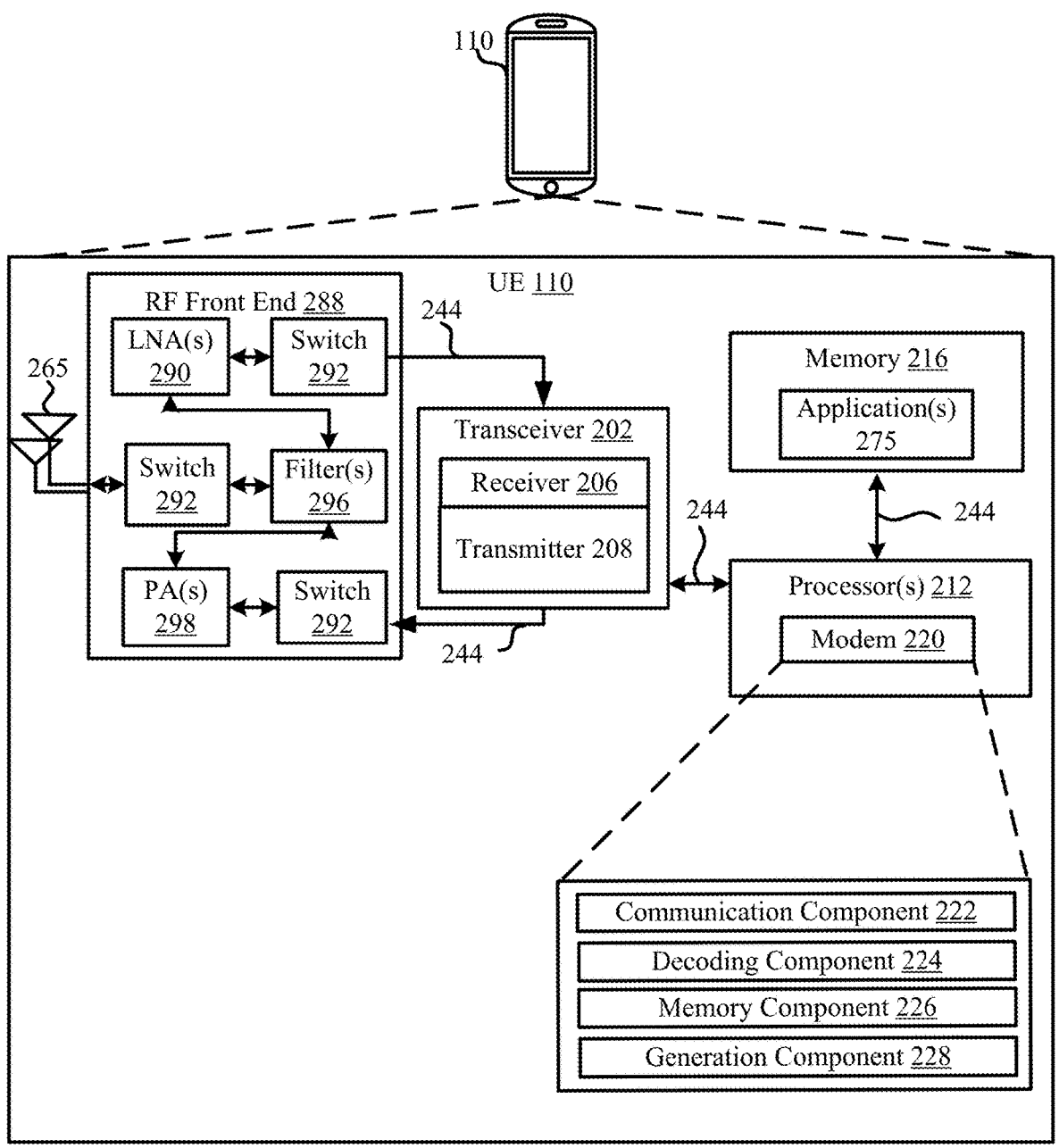
FIG. 2 is a schematic diagram of an example of a user equipment.

Referring to FIG. 2, one example of an implementation of the UE 110 may include a modem 220 having the communication component 222, the decoding component 224, the memory component 226, and/or the generation component 228. In one implementation, the UE 110 may include a communication component 222 configured to communicate with the BS 105 via a cellular network, a Wi-Fi network, or other wireless and wired networks. The UE 110 may include a decoding component 224 for decoding information received by the UE 110. The UE 110 may include a memory component 226 that manages one or more memories and/or buffers of the UE 110. The UE 110 may include a generation component 228 that generates acknowledgements (ACKs) and/or negative acknowledgements (NACKs).

In some implementations, the UE 110 may include a variety of components, including components such as one or more processors 212 and memory 216 and transceiver 202 in communication via one or more buses 244, which may operate in conjunction with the modem 220 and the communication component 222 to enable one or more of the functions described herein related to communicating with the BS 105. Further, the one or more processors 212, modem 220, memory 216, transceiver 202, RF front end 288 and one or more antennas 265, may be configured to support voice and/or data calls (simultaneously or non-simultaneously) in one or more radio access technologies. The one or more antennas 265 may include one or more antennas, antenna elements and/or antenna arrays.

In an aspect, the one or more processors 212 may include the modem 220 that uses one or more modem processors. The various functions related to the communication component 222, the decoding component 224, the memory component 226, and/or the generation component 228 may be included in the modem 220 and/or processors 212 and, in an aspect, may be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiving device processor, or a transceiver processor associated with transceiver 202. Additionally, the modem 220 may configure the UE 110 along with the processors 212. In other aspects, some of the features of the one or more processors 212 and/or the modem 220 associated with the communication component 222 may be performed by transceiver 202.

The memory 216 may be configured to store data used and/or local versions of application 275. Also, the memory 216 may be configured to store data used herein and/or local versions of the communication component 222, the decoding component 224, the memory component 226, and/or the generation component 228, and/or one or more of the subcomponents being executed by at least one processor 212. Memory 216 may include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining communication component 222, the decoding component 224, the memory component 226, and/or the generation component 228, and/or one or more of the subcomponents, and/or data associated therewith, when UE 110 is operating at least one processor 212 to execute the communication component 222, the decoding component 224, the memory component 226, and/or the generation component 228, and/or one or more of the subcomponents.

Transceiver 202 may include at least one receiver 206 and at least one transmitter 208. Receiver 206 may include hardware, firmware, and/or software code executable by a processor for receiving data, the code comprising instructions and being stored in a memory (e.g., computer-readable medium). Receiver 206 may be, for example, a RF receiving device. In an aspect, the receiver 206 may receive signals transmitted by at least one BS 105. Transmitter 208 may include hardware, firmware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, UE 110 may include RF front end 288, which may operate in communication with one or more antennas 265 and transceiver 202 for receiving and transmitting radio transmissions, for example, wireless communications transmitted by at least one BS 105 or wireless transmissions transmitted by UE 110. RF front end 288 may be coupled with one or more antennas 265 and may include one or more low-noise amplifiers (LNAs) 290, one or more switches 292, one or more power amplifiers (PAs) 298, and one or more filters 296 for transmitting and receiving RF signals.

In an aspect, LNA 290 may amplify a received signal at a desired output level. In an aspect, each LNA 290 may have a specified minimum and maximum gain values. In an aspect, RF front end 288 may use one or more switches 292 to select a particular LNA 290 and the specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and the specified gain value based on a desired gain value for a particular application.

Also, for example, one or more filters 296 may be used by RF front end 288 to filter a received signal to obtain an input RF signal. Similarly, in an aspect, for example, a respective filter 296 may be used to filter an output from a respective PA 298 to produce an output signal for transmission. In an aspect, each filter 296 may be coupled with a specific LNA 290 and/or PA 298. In an aspect, RF front end 288 may use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 110 may communicate with, for example, one or more BS 105 or one or more cells associated with one or more BS 105. In an aspect, for example, the modem 220 may configure transceiver 202 to operate at a specified frequency and power level based on the UE configuration of the UE 110 and the communication protocol used by the modem 220.

In an aspect, the modem 220 may be a multiband-multimode modem, which may process digital data and communicate with transceiver 202 such that the digital data is sent and received using transceiver 202. In an aspect, the modem 220 may be multiband and be configured to support multiple frequency bands for a specific communications protocol. In an aspect, the modem 220 may be multimode and be configured to support multiple operating networks and communications protocols. In an aspect, the modem 220 may control one or more components of UE 110 (e.g., RF front end 288, transceiver 202) to enable transmission and/or reception of signals from the network based on a specified modem configuration. In an aspect, the modem configuration may be based on the mode of the modem and the frequency band in use. In another aspect, the modem configuration may be based on UE configuration information associated with UE 110 as provided by the network.

Figure 3:
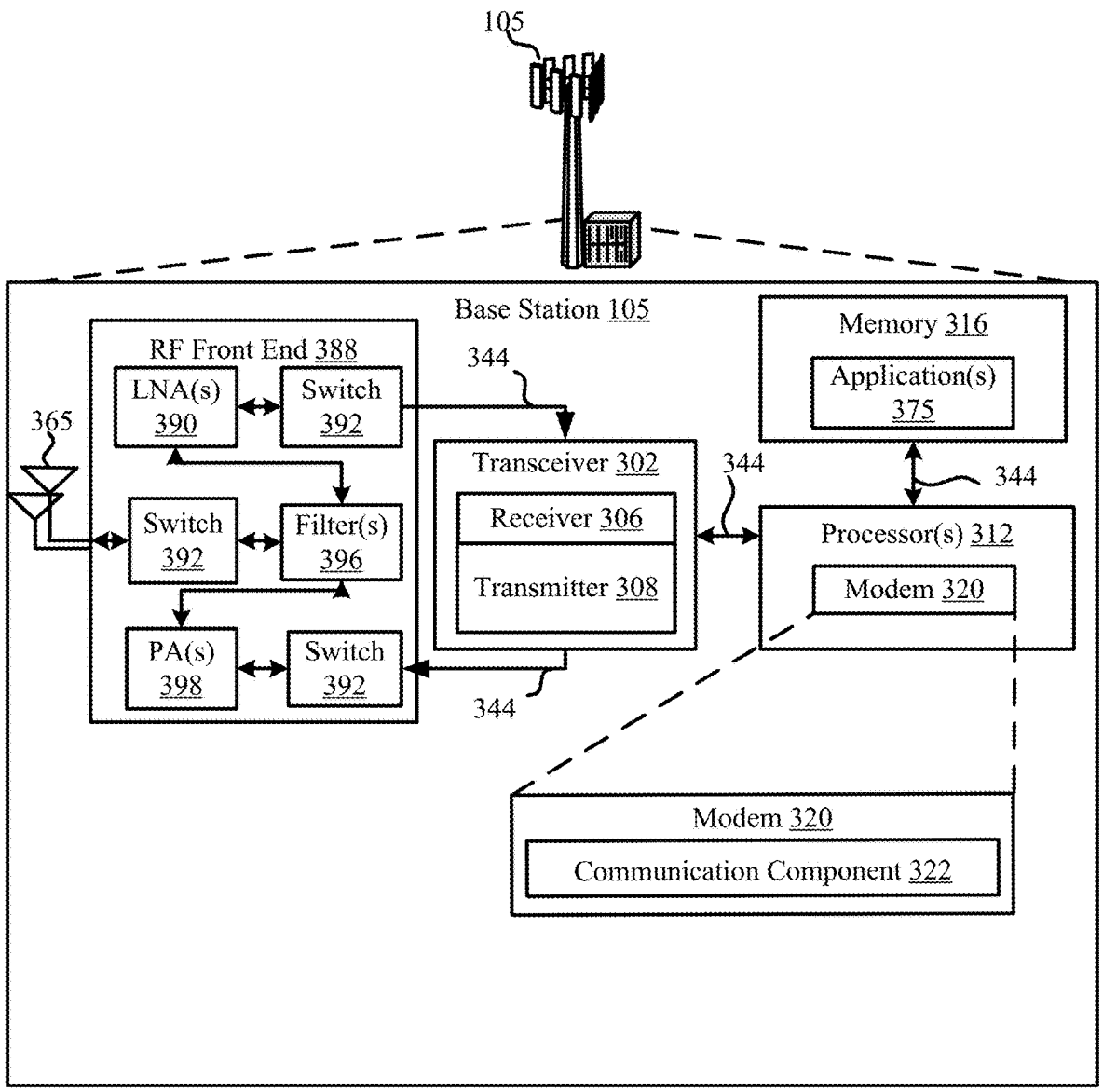
FIG. 3 is a schematic diagram of an example of a base station.

Referring to FIG. 3, one example of an implementation of the BS 105 may include a modem 320 having the communication component 322. In some implementations, the BS 105 may include a communication component 322 configured to communicate with the UE 110.

In some implementations, the BS 105 may include a variety of components, including components such as one or more processors 312 and memory 316 and transceiver 302 in communication via one or more buses 344, which may operate in conjunction with the modem 320 and the communication component 322 to enable one or more of the functions described herein related to communicating with the UE 110. Further, the one or more processors 312, modem 320, memory 316, transceiver 302, RF front end 388 and one or more antennas 365, may be configured to support voice and/or data calls (simultaneously or non-simultaneously) in one or more radio access technologies.

In an aspect, the one or more processors 312 may include the modem 320 that uses one or more modem processors. The various functions related to the communication component 322 may be included in the modem 320 and/or processors 312 and, in an aspect, may be executed by a single processor, while in other aspects, different ones of the functions may be executed by a combination of two or more different processors. For example, in an aspect, the one or more processors 312 may include any one or any combination of a modem processor, or a baseband processor, or a digital signal processor, or a transmit processor, or a receiving device processor, or a transceiver processor associated with transceiver 302. Additionally, the modem 320 may configure the BS 105 and processors 312. In other aspects, some of the features of the one or more processors 312 and/or the modem 320 associated with the communication component 322 may be performed by transceiver 302.

The memory 316 may be configured to store data used herein and/or local versions of applications 375. Also, the memory 316 may be configured to store data used herein and/or local versions of the communication component 322, and/or one or more of the subcomponents being executed by at least one processor 312. Memory 316 may include any type of computer-readable medium usable by a computer or at least one processor 312, such as random access memory (RAM), read only memory (ROM), tapes, magnetic discs, optical discs, volatile memory, non-volatile memory, and any combination thereof. In an aspect, for example, memory 316 may be a non-transitory computer-readable storage medium that stores one or more computer-executable codes defining the communication component 322, and/or one or more of the subcomponents, and/or data associated therewith, when the BS 105 is operating at least one processor 312 to execute the communication component 322, and/or one or more of the subcomponents.

Transceiver 302 may include at least one receiver 306 and at least one transmitter 308. The at least one receiver 306 may include hardware, firmware, and/or software code executable by a processor for receiving data, the code comprising instructions and being stored in a memory (e.g., computer-readable medium). The receiver 306 may be, for example, a RF receiving device. In an aspect, receiver 306 may receive signals transmitted by the UE 110. Transmitter 308 may include hardware, firmware, and/or software code executable by a processor for transmitting data, the code comprising instructions and being stored in a memory (e.g., computer-readable medium). A suitable example of transmitter 308 may including, but is not limited to, an RF transmitter.

Moreover, in an aspect, the BS 105 may include RF front end 388, which may operate in communication with one or more antennas 365 and transceiver 302 for receiving and transmitting radio transmissions, for example, wireless communications transmitted by other BS 105 or wireless transmissions transmitted by UE 110. RF front end 388 may be coupled with one or more antennas 365 and may include one or more low-noise amplifiers (LNAs) 390, one or more switches 392, one or more power amplifiers (PAs) 398, and one or more filters 396 for transmitting and receiving RF signals.

In an aspect, LNA 390 may amplify a received signal at a desired output level. In an aspect, each LNA 390 may have a specified minimum and maximum gain values. In an aspect, RF front end 388 may use one or more switches 392 to select a particular LNA 390 and the specified gain value based on a desired gain value for a particular application.

Further, for example, one or more PA(s) 398 may be used by RF front end 388 to amplify a signal for an RF output at a desired output power level. In an aspect, each PA 398 may have specified minimum and maximum gain values. In an aspect, RF front end 388 may use one or more switches 392 to select a particular PA 398 and the specified gain value based on a desired gain value for a particular application.

Also, for example, one or more filters 396 may be used by RF front end 388 to filter a received signal to obtain an input RF signal. Similarly, in an aspect, for example, a respective filter 396 may be used to filter an output from a respective PA 398 to produce an output signal for transmission. In an aspect, each filter 396 may be coupled with a specific LNA 390 and/or PA 398. In an aspect, RF front end 388 may use one or more switches 392 to select a transmit or receive path using a specified filter 396, LNA 390, and/or PA 398, based on a configuration as specified by transceiver 302 and/or processor 312.

As such, transceiver 302 may be configured to transmit and receive wireless signals through one or more antennas 365 via RF front end 388. In an aspect, transceiver may be tuned to operate at specified frequencies such that BS 105 may communicate with, for example, the UE 110 or one or more cells associated with one or more BS 105. In an aspect, for example, the modem 320 may configure transceiver 302 to operate at a specified frequency and power level based on the base station configuration of the BS 105 and the communication protocol used by the modem 320.

In an aspect, the modem 320 may be a multiband-multimode modem, which may process digital data and communicate with transceiver 302 such that the digital data is sent and received using transceiver 302. In an aspect, the modem 320 may be multiband and be configured to support multiple frequency bands for a specific communications protocol. In an aspect, the modem 320 may be multimode and be configured to support multiple operating networks and communications protocols. In an aspect, the modem 320 may control one or more components of the BS 105 (e.g., RF front end 388, transceiver 302) to enable transmission and/or reception of signals from the network based on a specified modem configuration. In an aspect, the modem configuration may be based on the mode of the modem and the frequency band in use. In another aspect, the modem configuration may be based on base station configuration associated with the BS 105.

Figure 4:
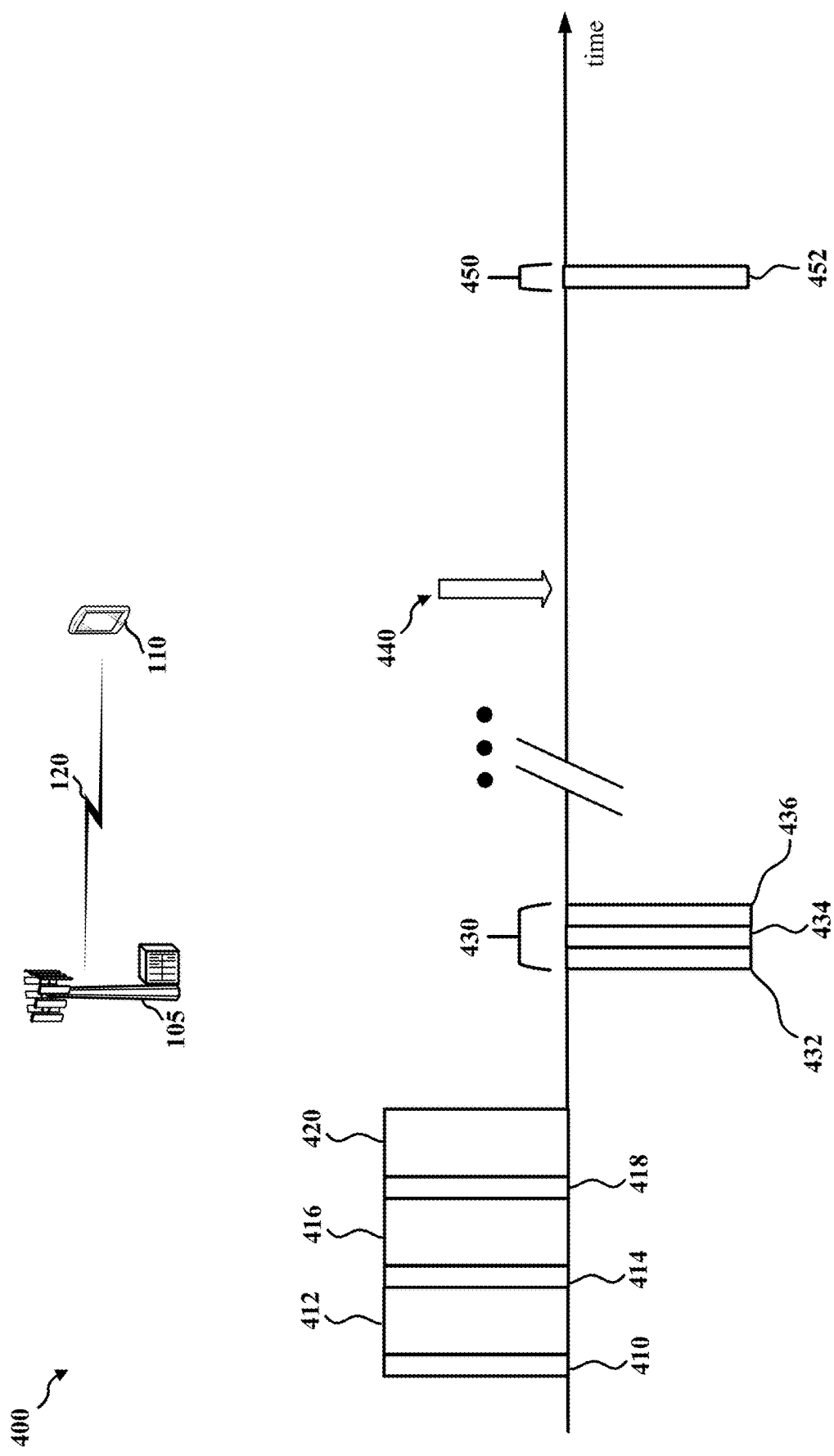
FIG. 4 illustrates a timing diagram showing the transmission of a reset NACK according to aspects of the present disclosure.

FIG. 4 illustrates a timing diagram showing the transmission of a reset NACK. In some implementation, the diagram 400 may show the BS 105 transmitting first physical downlink control channel (PDCCH) information 410, first physical downlink shared channel (PDSCH) information 412, second PDCCH information 414, second PDSCH information 416, third PDCCH information 418, and third PDSCH information 420 to the UE 110 via the communication links 120. The UE 110 may receive the PDCCH information 410, 414, 418 and the PDSCH information 412, 416, 420.

In certain instances, the UE 110 may be able to decode the first PDSCH information 412 and the third PDSCH information 420. The UE 110 may be unable to decode the second PDSCH information 416. For example, the UE 110 may be unable to decode the second PDSCH information 416 because of low transmission power, interferences, noise, obstructions, etc. In one example, the UE 110 may determine that the logarithmic likelihood ratio (LLR) associated with the second PDSCH information 416 is below a decoding threshold.

In an implementation, the UE 110 may transmit first physical uplink control channel (PUCCH) information 430 to the BS 105. The UE 110 may transmit a first acknowledgement (ACK) 432 and a second ACK 436 to the BS 105 in response to the UE 110 properly decoding the first PDSCH information 412 and the third PDSCH information 420. The UE 110 may transmit a negative acknowledgement (NACK) 434 to the BS 105 in response to the UE 110 failing to decode the second PDSCH information 416.

In certain implementations, at a time 440 after the UE 110 transmits the NACK 434, the UE 110 may determine that a hybrid automatic repeat request (HARQ) buffer of the UE 110 is unavailable. For example, the HARQ buffer may be full. The HARQ buffer may be unable to store additional LLRs associated with additional PDSCH information (not shown). The HARQ buffer may be implemented in the memory 216 (FIG. 2) of the UE 110.

In an aspect, the UE 110 may determine to reset the HARQ buffer. In one example, the UE 110 may determine to delete the LLR associated with the second PDSCH information 416 from the HARQ buffer. The UE 110 may determine to delete the LLR associated with the second PDSCH information 416 because the LLR is below a discard threshold, the LLR is the lowest LLR in the HARQ buffer, the LLR is one of the lowest LLRs in the HARQ buffer (e.g., in the lower x percentile, where x is a positive integer), the LLR is the oldest LLR in the HARQ buffer, or other reasons. In other examples, the UE 110 may delete the stored LLRs in the HARQ buffer.

In some aspects of the present disclosure, the UE 110 may transmit second PUCCH information 450 to the BS 105. The UE 110 may transmit the second PUCCH information 450 including a reset NACK 452 to the BS 105. The reset NACK 452 may indicate that the UE 110 has reset the HARQ buffer. The reset NACK 452 may indicate that the LLR associated with the second PDSCH information 416 has been deleted from the HARQ buffer. The UE 110 may transmit the second PUCCH in response to receiving additional PDSCH information (not shown).

Figure 5:
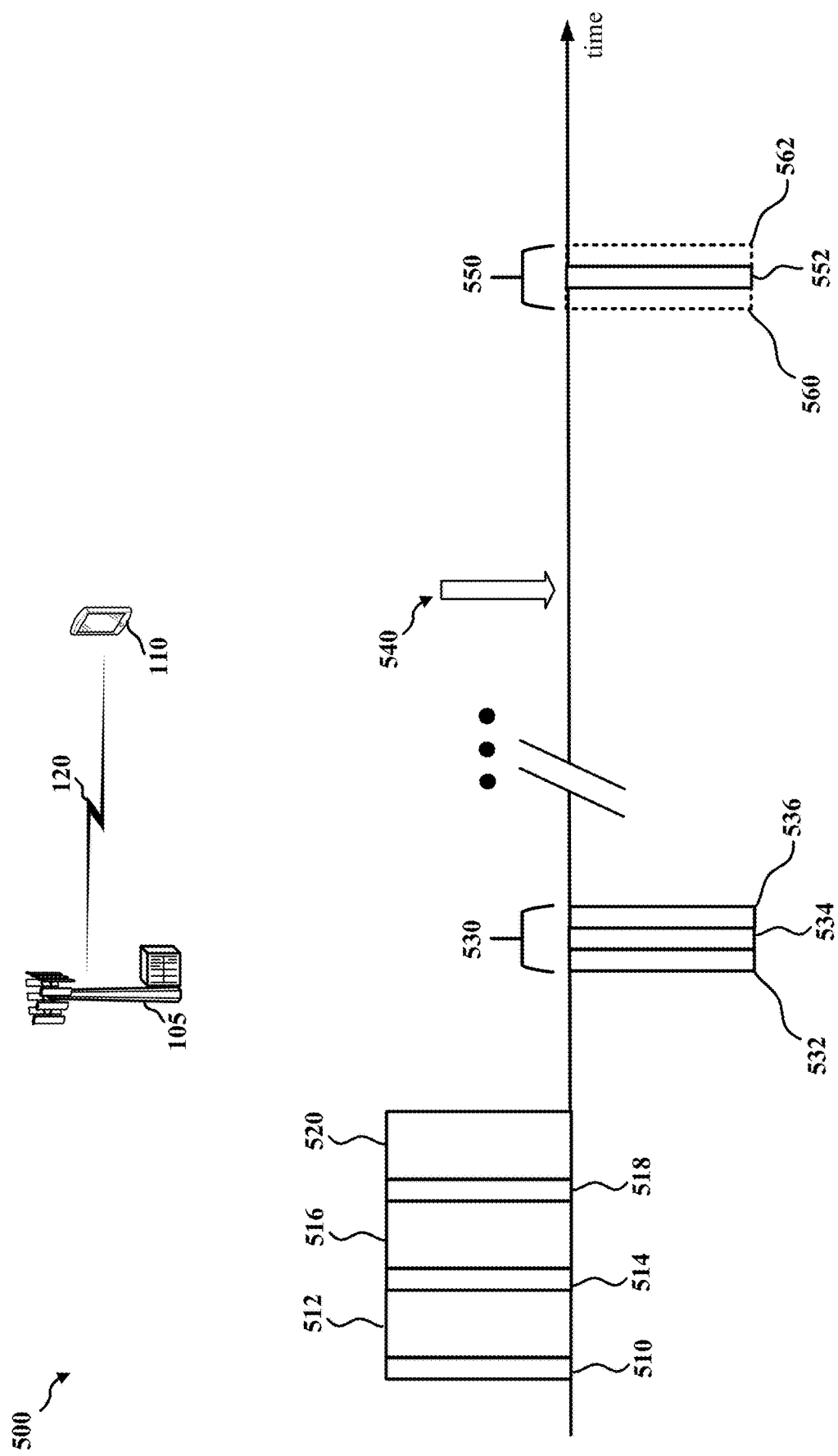
FIG. 5 illustrates a diagram showing a first example of a method for transmitting a reset NACK according to aspects of the present disclosure.

FIG. 5 illustrates a diagram showing a first example of a method for transmitting a reset NACK. In some implementation, the diagram 500 may show the BS 105 transmitting first PDCCH information 510, first PDSCH information 512, second PDCCH information 514, second PDSCH information 516, third PDCCH information 518, and third PDSCH information 520 to the UE 110 via the communication links 120. The UE 110 may receive the PDCCH information 510, 514, 518 and the PDSCH information 512, 516, 520.

In certain instances, the UE 110 may be able to decode the first PDSCH information 512 and the third PDSCH information 520. The UE 110 may be unable to decode the second PDSCH information 516. Example reasons that the UE 110 is unable to decode the second PDSCH information 516 may include low transmission power, interferences, noise, obstructions, etc. In one example, the UE 110 may determine that the LLR associated with the second PDSCH information 516 is below a decoding threshold.

In an implementation, the UE 110 may transmit first PUCCH information 530 to the BS 105. The UE 110 may transmit a first ACK 532 and a second ACK 536 to the BS 105 in response to the UE 110 properly decoding the first PDSCH information 512 and the third PDSCH information 520. The UE 110 may transmit a NACK 534 to the BS 105 in response to the UE 110 failing to decode the second PDSCH information 516.

In certain implementations, at a time 540 after the UE 110 transmits the NACK 534, the UE 110 may determine that a HARQ buffer of the UE 110 is unavailable. For example, the HARQ buffer may be full. The HARQ buffer may be unable to store additional LLRs associated with additional PDSCH information (not shown). The HARQ buffer may be implemented in the memory 216 (FIG. 2) of the UE 110.

In an aspect, the UE 110 may determine to reset the HARQ buffer. In one example, the UE 110 may determine to delete the LLR associated with the second PDSCH information 516 from the HARQ buffer. The UE 110 may determine to delete the LLR associated with the second PDSCH information 516 because the LLR is below a discard threshold, the LLR is the lowest LLR in the HARQ buffer, the LLR is one of the lowest LLRs in the HARQ buffer (e.g., in the lower x percentile, where x is a positive integer), the LLR is the oldest LLR in the HARQ buffer, or other reasons. In other examples, the UE 110 may delete the stored LLRs in the HARQ buffer.

In some aspects of the present disclosure, the UE 110 may transmit second PUCCH information 550 to the BS 105. The UE 110 may transmit the second PUCCH information 550 including a reset NACK 552 to the BS 105. The reset NACK 552 may be associated with the second PDSCH information 516. The reset NACK 552 may indicate that the LLR associated with the second PDSCH information 516 has been deleted from the HARQ buffer. The content of the reset NACK 552 may be used to override or replace the content of the NACK 534.

In optional implementations, the second PUCCH information 550 may include a third ACK 560 and a fourth ACK 562. The third ACK 560 may carry similar or identical payload as the first ACK 532. The fourth ACK 562 may carry similar or identical payload as the second ACK 536. The content of the third ACK 560 may override or replace the content of the first ACK 532. The content of the fourth ACK 562 may override or replace the content of the second ACK 536.

Figure 6:
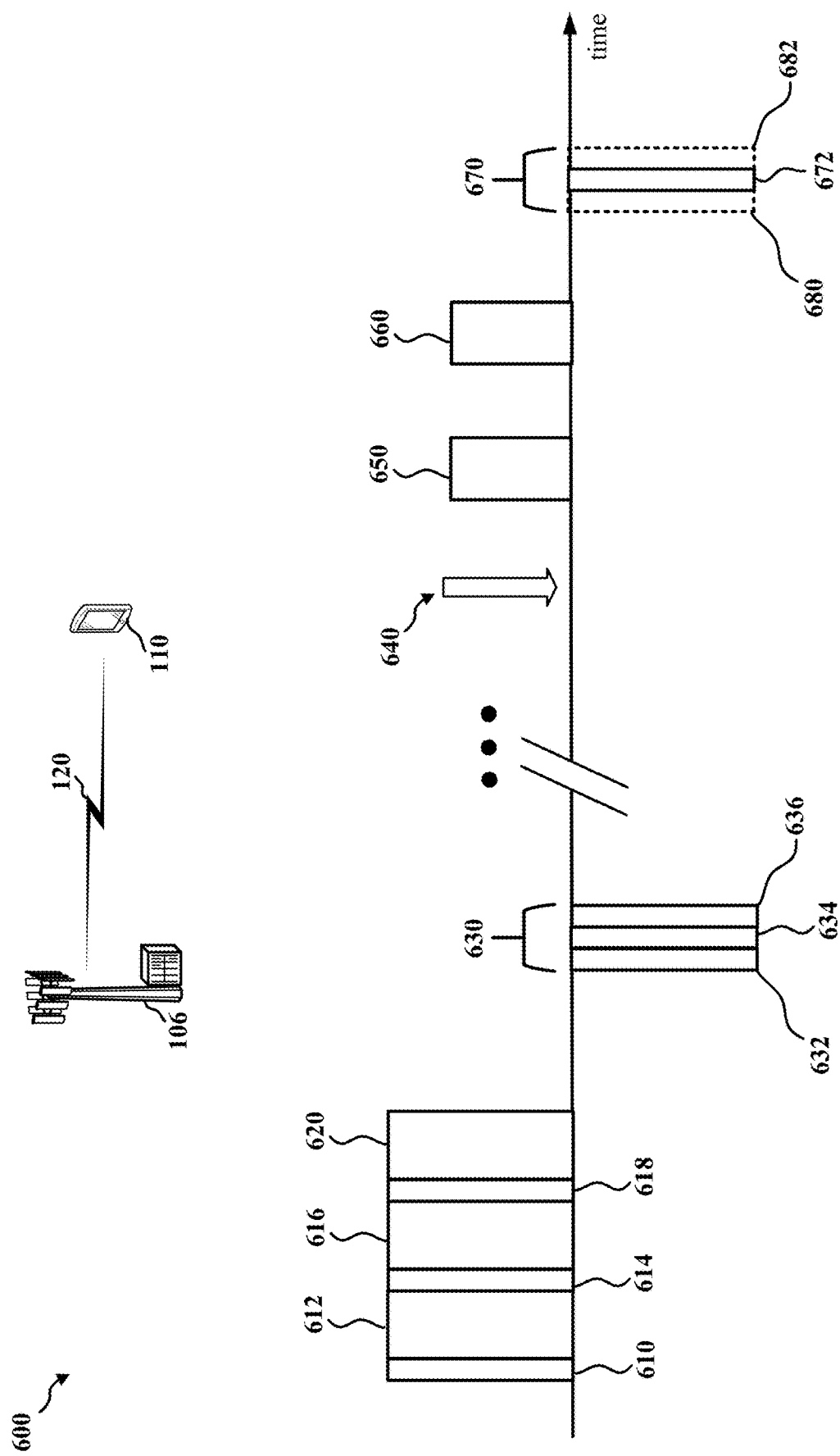
FIG. 6 illustrates a diagram showing a second example of a method for transmitting a reset NACK according to aspects of the present disclosure.

FIG. 6 illustrates a diagram showing a second example of a method for transmitting a reset NACK. In some implementation, the diagram 600 may show the BS 105 transmitting first PDCCH information 610, first PDSCH information 612, second PDCCH information 614, second PDSCH information 616, third PDCCH information 618, and third PDSCH information 620 to the UE 110 via the communication links 120. The UE 110 may receive the PDCCH information 610, 614, 618 and the PDSCH information 612, 616, 620.

In certain instances, the UE 110 may be able to decode the first PDSCH information 612 and the third PDSCH information 620. The UE 110 may be unable to decode the second PDSCH information 616. Example reasons that the UE 110 is unable to decode the second PDSCH information 616 may include low transmission power, interferences, noise, obstructions, etc. In one example, the UE 110 may determine that the LLR associated with the second PDSCH information 616 is below a decoding threshold.

In an implementation, the UE 110 may transmit first PUCCH information 630 to the BS 105. The UE 110 may transmit a first ACK 632 and a second ACK 636 to the BS 105 in response to the UE 110 properly decoding the first PDSCH information 612 and the third PDSCH information 620. The UE 110 may transmit a NACK 634 to the BS 105 in response to the UE 110 failing to decode the second PDSCH information 616.

In certain implementations, at a time 640 after the UE 110 transmits the NACK 634, the UE 110 may determine that a HARQ buffer of the UE 110 is unavailable. For example, the HARQ buffer may be full. The HARQ buffer may be unable to store additional LLRs associated with additional PDSCH information (not shown). The HARQ buffer may be implemented in the memory 216 (FIG. 2) of the UE 110.

In an aspect, the UE 110 may determine to reset the HARQ buffer. In one example, the UE 110 may determine to delete the LLR associated with the second PDSCH information 616 from the HARQ buffer. The UE 110 may determine to delete the LLR associated with the second PDSCH information 616 because the LLR is below a discard threshold, the LLR is the lowest LLR in the HARQ buffer, the LLR is one of the lowest LLRs in the HARQ buffer (e.g., in the lower x percentile, where x is a positive integer), the LLR is the oldest LLR in the HARQ buffer, or other reasons. In other examples, the UE 110 may delete the stored LLRs in the HARQ buffer.

In certain aspects of the present disclosure, the UE 110 may transmit a scheduling request (SR) 650 to the BS 105 to request uplink resources for the transmission of the second PUCCH information 670 and/or the reset NACK 672. In response, the BS 105 may grant the SR 650 and transmit a downlink control indicator (DCI) 660 to notify the UE 110 of the allocated uplink resources for the second PUCCH information 670 and/or the reset NACK 672.

In some aspects of the present disclosure, the UE 110 may transmit second PUCCH information 670 to the BS 105. The UE 110 may transmit the second PUCCH information 670 including a reset NACK 672 to the BS 105. The reset NACK 672 may be associated with the second PDSCH information 616. The reset NACK 672 may indicate that the LLR associated with the second PDSCH information 616 has been deleted from the HARQ buffer. The content of the reset NACK 672 may be used to override or replace the content of the NACK 634.

In optional implementations, the second PUCCH information 670 may include a third ACK 680 and a fourth ACK 682. The third ACK 680 may carry similar or identical payload as the first ACK 632. The fourth ACK 682 may carry similar or identical payload as the second ACK 636. The content of the third ACK 680 may override or replace the content of the first ACK 632. The content of the fourth ACK 682 may override or replace the content of the second ACK 636.

Figure 7:
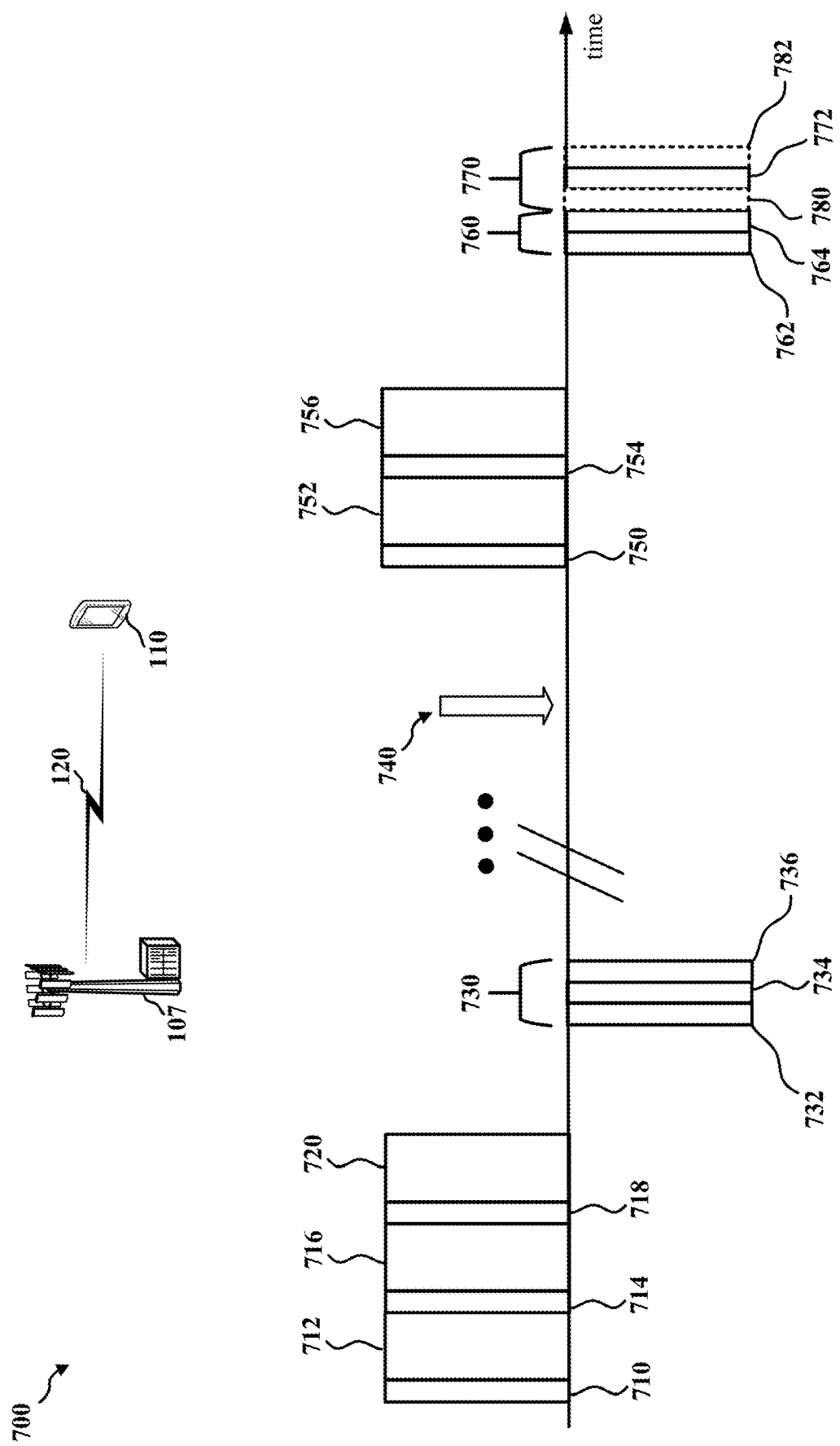
FIG. 7 illustrates a diagram showing an example of a third example for transmitting a reset NACK according to aspects of the present disclosure.

FIG. 7 illustrates a diagram showing an example of a third example for transmitting a reset NACK. In some implementation, the diagram 700 may show the BS 105 transmitting first PDCCH information 710, first PDSCH information 712, second PDCCH information 714, second PDSCH information 716, third PDCCH information 718, and third PDSCH information 720 to the UE 110 via the communication links 120. The UE 110 may receive the PDCCH information 710, 714, 718 and the PDSCH information 712, 716, 720.

In certain instances, the UE 110 may be able to decode the first PDSCH information 712 and the third PDSCH information 720. The UE 110 may be unable to decode the second PDSCH information 716. Example reasons that the UE 110 is unable to decode the second PDSCH information 716 may include low transmission power, interferences, noise, obstructions, etc. In one example, the UE 110 may determine that the LLR associated with the second PDSCH information 716 is below a decoding threshold.

In an implementation, the UE 110 may transmit first PUCCH information 730 to the BS 105. The UE 110 may transmit a first ACK 732 and a second ACK 736 to the BS 105 in response to the UE 110 properly decoding the first PDSCH information 712 and the third PDSCH information 720. The UE 110 may transmit a first NACK 734 to the BS 105 in response to the UE 110 failing to decode the second PDSCH information 716.

In certain implementations, at a time 740 after the UE 110 transmits the first NACK 734, the UE 110 may determine that a HARQ buffer of the UE 110 is unavailable. For example, the HARQ buffer may be full. The HARQ buffer may be unable to store additional LLRs associated with additional PDSCH information (not shown). The HARQ buffer may be implemented in the memory 216 (FIG. 2) of the UE 110.

In an aspect, the UE 110 may determine to reset the HARQ buffer. In one example, the UE 110 may determine to delete the LLR associated with the second PDSCH information 716 from the HARQ buffer. The UE 110 may determine to delete the LLR associated with the second PDSCH information 716 because the LLR is below a discard threshold, the LLR is the lowest LLR in the HARQ buffer, the LLR is one of the lowest LLRs in the HARQ buffer (e.g., in the lower x percentile, where x is a positive integer), the LLR is the oldest LLR in the HARQ buffer, or other reasons. In other examples, the UE 110 may delete the stored LLRs in the HARQ buffer.

In some aspects of the present disclosure, the BS 105 may transmit fourth PDCCH information 750, fourth PDSCH information 752, fifth PDCCH information 754, and fifth PDSCH information 756 to the UE 110 after the time 740. In response, the UE 110 may transmit second PUCCH information 760 to the BS 105. The UE 110 may transmit a third ACK 762 to the BS 105 in response to the UE 110 properly decoding the fourth PDSCH information 752. The UE 110 may transmit a second NACK 764 to the BS 105 in response to the UE 110 failing to decode the fifth PDSCH information 756.

In certain aspects, the UE 110 may append third PUCCH information 770 to the second PUCCH information 760. The UE 110 may transmit the third PUCCH information 770 to the BS 105 using at least some of the resources allocated (by the BS 105) for the second PUCCH information 760. The UE 110 may transmit the third PUCCH information 770 including a reset NACK 772 to the BS 105. The reset NACK 772 may be associated with the second PDSCH information 616. The reset NACK 772 may indicate that the LLR associated with the second PDSCH information 716 has been deleted from the HARQ buffer. The content of the reset NACK 772 may be used to override or replace the content of the NACK 734. While the diagram 700 shows the third PUCCH information 770 being appended to the end of the second PUCCH information 760, the third PUCCH information 770 may be appended to the beginning or the end, interspersed, or any combination of the above.

In optional implementations, the third PUCCH information 770 may include a fourth ACK 780 and a fifth ACK 782. The fourth ACK 780 may carry similar or identical payload as the first ACK 732. The fifth ACK 782 may carry similar or identical payload as the second ACK 736. The content of the fourth ACK 780 may override or replace the content of the first ACK 732. The content of the fifth ACK 782 may override or replace the content of the second ACK 736.

In alternative implementations, the UE 110 may append the third PUCCH information 770 to any of PUCCH information (e.g., the first one), such as the second PUCCH information 760, after a first threshold time.

In alternative aspects, the UE 110 may prune the PUCCH payload, such as the fourth ACK 780 and/or the fifth ACK 782, if the second PUCCH information 760 occurs a second threshold time after the first PUCCH information 730.

In some implementations, the first threshold time and/or the second threshold time may provide the BS 105 sufficient time to process the first PUCCH information 730. The processing time may be different depending on the PUCCH formats because the BS 105 may utilize different decoding processes for different PUCCH formats.

In certain implementations, the BS 105 may request the UE 110 to repeat the HARQ feedback for a select subset of HARQ processes. The HARQ processes may be grouped into one or more groups. The group index may be included in the DCI scheduling the PDSCH transmission.

For example, if a group of HARQ processes has a high number (e.g., above a certain threshold) of NACKs, the BS 105 may poll the UE 110 to retransmit the ACK/NACK feedbacks for some or all HARQ processes belonging to the group.

In some instances, a DCI may be used to poll the UE 110 to retransmit the ACK, NACK, and/or reset NACK states where the UE 110 is allowed to change the state of any of the NACK to a reset NACK.

In some cases, if the UE 110 reports a reset NACK for a HARQ process, the BS 105 may assume that the UE 110 has discarded the LLRs associated with the HARQ process.

In certain instances, if additional PDSCH within a group are scheduled between two PUCCHs (e.g., the first PUCCH information 730 and the second PUCCH information 760) such that the ACK "fits" into the PUCCH-2, the HARQ feedback response to the polling may include the PDSCH.

In some instances, the total downlink assignment index (T-DAI) and/or the counter DAI (C-DAI) may be associated with a group.

Figure 8:
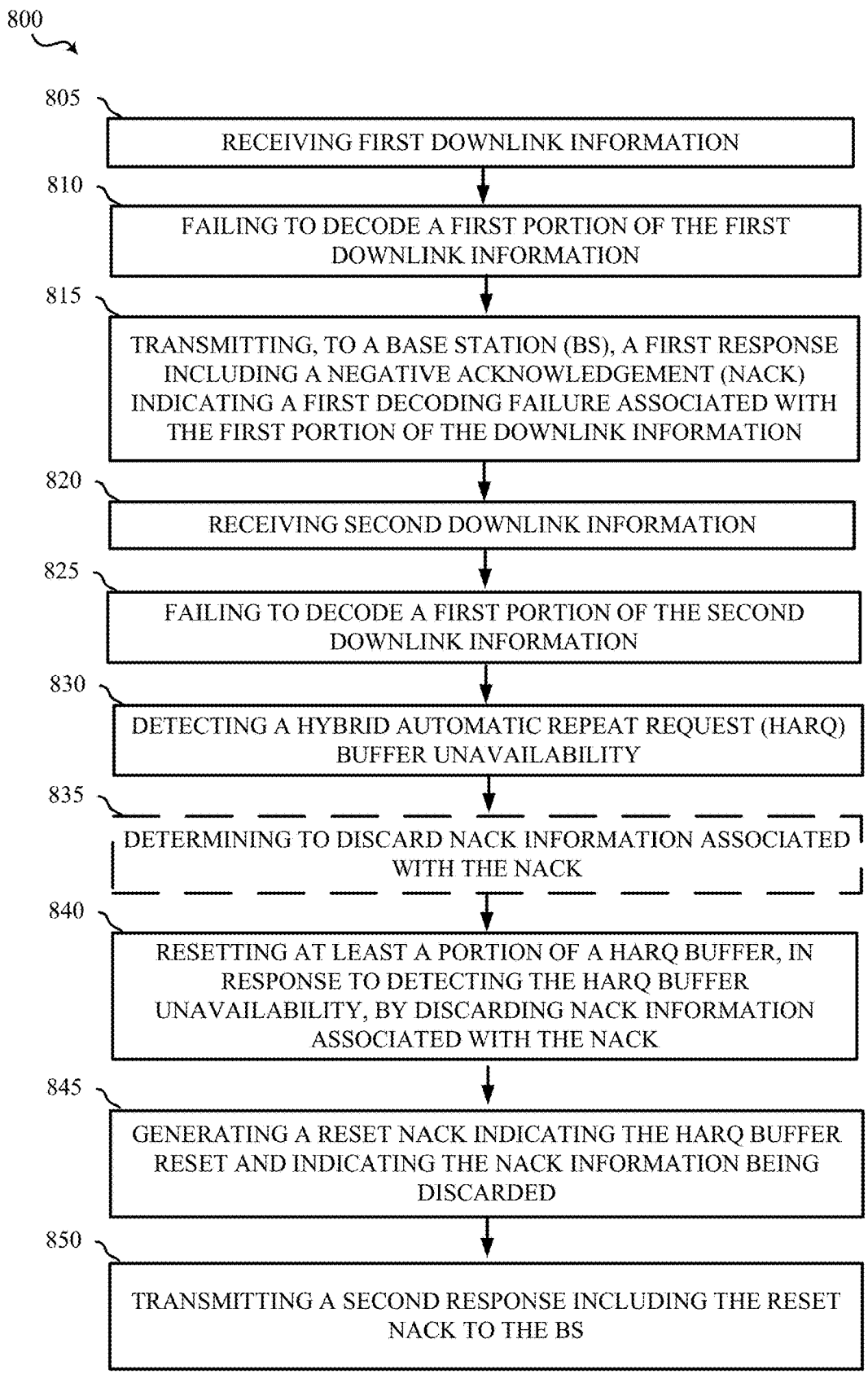
FIG. 8 illustrates an example of a method for transmitting a reset NACK according to aspects of the present disclosure.

FIG. 8 illustrates an example of a method for transmitting a reset NACK. For example, a method 800 may be performed by the one or more of the processor 212, the memory 216, the applications 275, the modem 220, the transceiver 202, the receiver 206, the transmitter 208, the RF front end 288, the communication component 222, the decoding component 224, the memory component 226, and/or the generation component 228, and/or one or more other components of the UE 110 in the wireless communication network 100.

At block 805, the method 800 may receiving first downlink information. For example, the communication component 222, the transceiver 202, the receiver 206, the transmitter 208, the RF front end 288, the subcomponents of the RF front end 288, the processor 212, the memory 216, the modem 220, and/or the applications 275 of the UE 110 may receiving first downlink information as described above. The RF front end 288 may receive the electrical signals converted from electro-magnetic signals. The RF front end 288 may filter and/or amplify the electrical signals. The transceiver 202 or the receiver 206 may convert the electrical signals to digital signals, and send the digital signals to the communication component 222.

In certain implementations, the communication component 222, the transceiver 202, the receiver 206, the transmitter 208, the RF front end 288, the subcomponents of the RF front end 288, the processor 212, the memory 216, the modem 220, and/or the applications 275 may be configured to and/or may define means for receiving first downlink information.

At block 810, the method 800 may fail to decode a first portion of the first downlink information. For example, the decoding component 224 the processor 212, the memory 216, the modem 220, and/or the applications 275 of the UE 110 may fail to decode a first portion of the first downlink information as described above.

In certain implementations, the decoding component 224 the processor 212, the memory 216, the modem 220, and/or the applications 275 may be configured to and/or may define means for failing to decode a first portion of the first downlink information.

At block 815, the method 800 may transmit to a base station (BS), a first response including a negative acknowledgement (NACK) indicating a first decoding failure associated with the first portion of the first downlink information. For example, the communication component 222, the transceiver 202, the receiver 206, the transmitter 208, the RF front end 288, the subcomponents of the RF front end 288, the processor 212, the memory 216, the modem 220, and/or the applications 275 of the UE 110 may transmit to a base station (BS), a first response including a negative acknowledgement (NACK) indicating a first decoding failure associated with the first portion of the first downlink information. The communication component 222 may send the digital signals to the transceiver 202 or the transmitter 208. The transceiver 202 or the transmitter 208 may convert the digital signals to electrical signals and send to the RF front end 288. The RF front end 288 may filter and/or amplify the electrical signals. The RF front end 288 may send the electrical signals as electro-magnetic signals via the one or more antennas 265.

In certain implementations, the communication component 222, the transceiver 202, the receiver 206, the transmitter 208, the RF front end 288, the subcomponents of the RF front end 288, the processor 212, the memory 216, the modem 220, and/or the applications 275 may be configured to and/or may define means for transmitting, to a base station (BS), a first response including a negative acknowledgement (NACK) indicating a first decoding failure associated with the first portion of the first downlink information.

At block 820, the method 800 may receive second downlink information. For example, the communication component 222, the transceiver 202, the receiver 206, the transmitter 208, the RF front end 288, the subcomponents of the RF front end 288, the processor 212, the memory 216, the modem 220, and/or the applications 275 of the UE 110 may receive second downlink information as described above. The RF front end 288 may receive the electrical signals converted from electro-magnetic signals. The RF front end 288 may filter and/or amplify the electrical signals. The transceiver 202 or the receiver 206 may convert the electrical signals to digital signals, and send the digital signals to the communication component 222.

In certain implementations, the communication component 222, the transceiver 202, the receiver 206, the transmitter 208, the RF front end 288, the subcomponents of the RF front end 288, the processor 212, the memory 216, the modem 220, and/or the applications 275 may be configured to and/or may define means for receiving second downlink information.

At block 825, the method 800 may fail to decode a first portion of the second downlink information. For example, the decoding component 224, the processor 212, the memory 216, the modem 220, and/or the applications 275 of the UE 110 may fail to decode a first portion of the second downlink information as described above.

In certain implementations, the decoding component 224, the processor 212, the memory 216, the modem 220, and/or the applications 275 may be configured to and/or may define means for failing to decode a first portion of the second downlink information.

At block 830, the method 800 may detect a hybrid automatic repeat request (HARQ) buffer unavailability. For example, the memory component 226, the processor 212, the memory 216, the modem 220, and/or the applications 275 of the UE 110 may detect a hybrid automatic repeat request (HARQ) buffer unavailability.

In certain implementations, the memory component 226, the processor 212, the memory 216, the modem 220, and/or the applications 275 may be configured to and/or may define means for detecting a hybrid automatic repeat request (HARQ) buffer unavailability.

At block 835, the method 800 may optionally determine to discard NACK information associated with the NACK. For example, the memory component 226, the processor 212, the memory 216, the modem 220, and/or the applications 275 of the UE 110 may determine to discard NACK information associated with the NACK.

In certain implementations, the memory component 226, the processor 212, the memory 216, the modem 220, and/or the applications 275 may be configured to and/or may define means for determining to discard NACK information associated with the NACK.

At block 840, the method 800 may reset at least a portion of a HARQ buffer, in response to detecting the HARQ buffer unavailability, by discarding NACK information associated with the NACK. For example, the memory component 226, the processor 212, the memory 216, the modem 220, and/or the applications 275 of the UE 110 may reset at least a portion of a HARQ buffer, in response to detecting the HARQ buffer unavailability, by discarding NACK information associated with the NACK.

In certain implementations, the memory component 226, the processor 212, the memory 216, the modem 220, and/or the applications 275 may be configured to and/or may define means for resetting at least a portion of a HARQ buffer, in response to detecting the HARQ buffer unavailability, by discarding NACK information associated with the NACK.

At block 845, the method 800 may generate a reset NACK indicating the HARQ buffer reset and indicating the NACK information being discarded. For example, the generation component 228, the processor 212, the memory 216, the modem 220, and/or the applications 275 of the UE 110 may generate a reset NACK indicating the HARQ buffer reset and indicating the NACK information being discarded.

In certain implementations, the generation component 228, the processor 212, the memory 216, the modem 220, and/or the applications 275 may be configured to and/or may define means for generating a reset NACK indicating the HARQ buffer reset and indicating the NACK information being discarded.

At block 850, the method may transmit a second response including the reset NACK to the B S. For example, the communication component 222, the transceiver 202, the receiver 206, the transmitter 208, the RF front end 288, the subcomponents of the RF front end 288, the processor 212, the memory 216, the modem 220, and/or the applications 275 may transmit a second response including the reset NACK to the BS. The communication component 222 may send the digital signals to the transceiver 202 or the transmitter 208. The transceiver 202 or the transmitter 208 may convert the digital signals to electrical signals and send to the RF front end 288. The RF front end 288 may filter and/or amplify the electrical signals. The RF front end 288 may send the electrical signals as electro-magnetic signals via the one or more antennas 265.

In certain implementations, the communication component 222, the transceiver 202, the receiver 206, the transmitter 208, the RF front end 288, the subcomponents of the RF front end 288, the processor 212, the memory 216, the modem 220, and/or the applications 275 may be configured to and/or may define means for transmitting a second response including the reset NACK to the BS.

Alternatively or additionally, the method 800 may further include any of the methods above, wherein the NACK information comprises log-likelihood ratio (LLR) associated with the first portion of the first downlink information.

Alternatively or additionally, the method 800 may further include any of the methods above, wherein transmitting the second response comprises transmitting the second response on one of a plurality of resources scheduled by the BS for responses associated with the first downlink information or the second downlink information.

Alternatively or additionally, the method 800 may further include any of the methods above, wherein transmitting the second response comprises transmitting an indication associated with updating a first content of the first response with a second content of the second response.

Alternatively or additionally, the method 800 may further include any of the methods above, wherein transmitting the second response comprises transmitting an indication associated with updating a first content, of the first response, associated with the NACK with a second content, of the second response, associated with the reset NACK.

Alternatively or additionally, the method 800 may further include any of the methods above, wherein the first response includes additional information associated with the first downlink information other than the NACK, and the second response includes the additional information.

Alternatively or additionally, the method 800 may further include any of the methods above, further comprising transmitting, in response to detecting the HARQ buffer unavailability, a scheduling request (SR) to the BS to allocate resources for the second response, receiving an indication indicating the allocated resources, and wherein transmitting the second response comprises transmitting the second response via the allocated resources.

Alternatively or additionally, the method 800 may further include any of the methods above, wherein transmitting the second response comprises transmitting the second response on resources allocated for transmissions unassociated with the first downlink information or the second downlink information.

Alternatively or additionally, the method 800 may further include any of the methods above, wherein transmitting the second response further comprises transmitting an indication associated with updating a first content of the first response with a second content of the second response.

Alternatively or additionally, the method 800 may further include any of the methods above, wherein transmitting the indication comprises transmitting the indication after a threshold time.

Alternatively or additionally, the method 800 may further include any of the methods above, wherein transmitting the second response comprises transmitting an indication associated with updating a first content, of the first response, associated with the NACK with a second content, of the second response, associated with the reset NACK.

Alternatively or additionally, the method 800 may further include any of the methods above, wherein transmitting the indication comprises transmitting the indication after a threshold time.

Alternatively or additionally, the method 800 may further include any of the methods above, further comprising receiving prior to transmitting the second response, a request from the BS to generate a HARQ response associated with the first downlink information or the second downlink information.

Alternatively or additionally, the method 800 may further include any of the methods above, wherein the request is indicated in a downlink control indicator (DCI).

Alternatively or additionally, the method 800 may further include any of the methods above, further comprising determining to discard the NACK information associated with the NACK.

Figure 9:
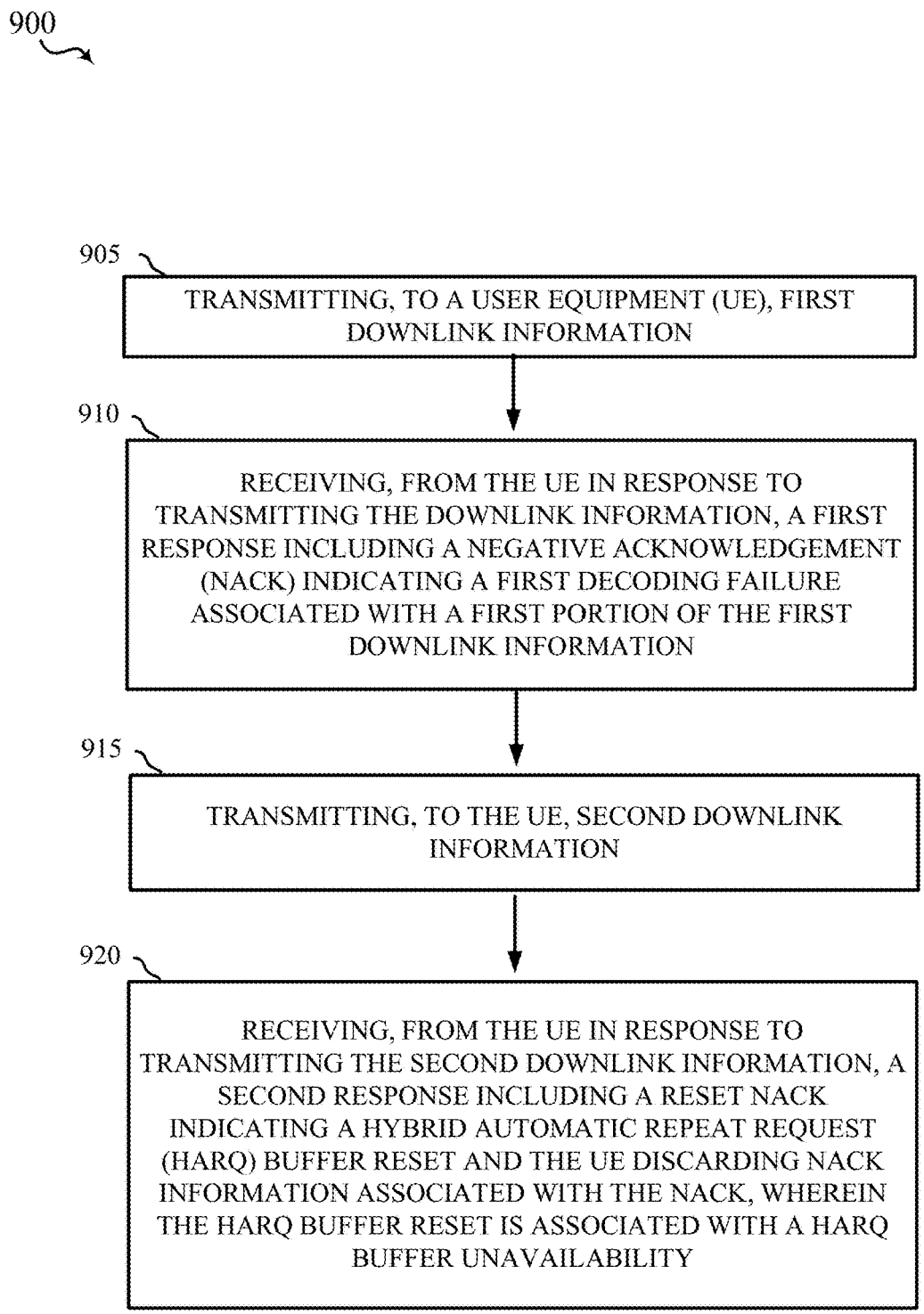
FIG. 9 illustrates an example of a method for receiving a reset NACK according to aspects of the present disclosure.

FIG. 9 illustrates an example of a method for receiving a reset NACK. For example, a method 900 may be performed by the one or more of the processor 312, the memory 316, the applications 375, the modem 320, the transceiver 302, the receiver 306, the transmitter 308, the RF front end 388, the communication component 322, and/or one or more other components of the BS 105 in the wireless communication network 100.

At block 905, the method 900 may transmit, to a user equipment (UE), first downlink information. For example, the communication component 322, the transceiver 302, the receiver 306, the transmitter 308, the RF front end 388, the subcomponents of the RF front end 388, the processor 312, the memory 316, the modem 320, and/or the applications 375 of the BS 105 may transmit, to a user equipment (UE), first downlink information. The communication component 322 may send the digital signals to the transceiver 302 or the transmitter 308. The transceiver 302 or the transmitter 308 may convert the digital signals to electrical signals and send to the RF front end 388. The RF front end 388 may filter and/or amplify the electrical signals. The RF front end 388 may send the electrical signals as electro-magnetic signals via the one or more antennas 365.

In certain implementations, the communication component 322, the transceiver 302, the receiver 306, the transmitter 308, the RF front end 388, the subcomponents of the RF front end 388, the processor 312, the memory 316, the modem 320, and/or the applications 375 may be configured to and/or may define means for transmitting, to a user equipment (UE), first downlink information.

At block 910, the method 900 may receive, from the UE in response to transmitting the downlink information, a first response including a negative acknowledgement (NACK) indicating a first decoding failure associated with a first portion of the first downlink information. For example, the communication component 322, the transceiver 302, the receiver 306, the transmitter 308, the RF front end 388, the subcomponents of the RF front end 388, the processor 312, the memory 316, the modem 320, and/or the applications 375 of the BS 105 may receive, from the UE in response to transmitting the downlink information, a first response including a negative acknowledgement (NACK) indicating a first decoding failure associated with a first portion of the first downlink information. The RF front end 388 may receive the electrical signals converted from electro-magnetic signals. The RF front end 388 may filter and/or amplify the electrical signals. The transceiver 302 or the receiver 306 may convert the electrical signals to digital signals, and send the digital signals to the communication component 322.

In certain implementations, the communication component 322, the transceiver 302, the receiver 306, the transmitter 308, the RF front end 388, the subcomponents of the RF front end 388, the processor 312, the memory 316, the modem 320, and/or the applications 375 may be configured to and/or may define means for receiving, from the UE in response to transmitting the downlink information, a first response including a negative acknowledgement (NACK) indicating a first decoding failure associated with a first portion of the first downlink information.

At block 915, the method 900 may transmit, to the UE, second downlink information. For example, the communication component 322, the transceiver 302, the receiver 306, the transmitter 308, the RF front end 388, the subcomponents of the RF front end 388, the processor 312, the memory 316, the modem 320, and/or the applications 375 of the BS 105 may transmit, to the UE, second downlink information. The communication component 322 may send the digital signals to the transceiver 302 or the transmitter 308. The transceiver 302 or the transmitter 308 may convert the digital signals to electrical signals and send to the RF front end 388. The RF front end 388 may filter and/or amplify the electrical signals. The RF front end 388 may send the electrical signals as electro-magnetic signals via the one or more antennas 365.

In certain implementations, the communication component 322, the transceiver 302, the receiver 306, the transmitter 308, the RF front end 388, the subcomponents of the RF front end 388, the processor 312, the memory 316, the modem 320, and/or the applications 375 may be configured to and/or may define means for transmitting, to the UE, second downlink information.

At block 920, the method 900 may receive, from the UE in response to transmitting the second downlink information, a second response including a reset NACK. The resent NACK indicates a hybrid automatic repeat request (HARQ) buffer reset and/or indicates that the UE has discarded NACK information associated with the NACK. As described above with reference to FIG. 8, the UE may discard NACK information associated with the NACK in response to detecting a HARQ buffer unavailability. As such, the HARQ buffer reset can be associated with a HARQ buffer unavailability. For example, the communication component 322, the transceiver 302, the receiver 306, the transmitter 308, the RF front end 388, the subcomponents of the RF front end 388, the processor 312, the memory 316, the modem 320, and/or the applications 375 of the BS 105 may receive, from the UE in response to transmitting the second downlink information, a second response including a reset NACK as described above. The RF front end 388 may receive the electrical signals converted from electromagnetic signals. The RF front end 388 may filter and/or amplify the electrical signals. The transceiver 302 or the receiver 306 may convert the electrical signals to digital signals, and send the digital signals to the communication component 322.

In certain implementations, the communication component 322, the transceiver 302, the receiver 306, the transmitter 308, the RF front end 388, the subcomponents of the RF front end 388, the processor 312, the memory 316, the modem 320, and/or the applications 375 may be configured to and/or may define means for receiving, from the UE in response to transmitting the second downlink information, a second response including a reset NACK indicating a hybrid automatic repeat request (HARQ) buffer reset and the UE discarding NACK information associated with the NACK, wherein the HARQ buffer reset is associated with a HARQ buffer unavailability.

Additional Implementations

Aspects of the present disclosure include methods by a user equipment (UE) for receiving first downlink information, failing to decode a first portion of the first downlink information, transmitting, to a base station (BS), a first response including a negative acknowledgement (NACK) indicating a first decoding failure associated with the first portion of the first downlink information, receiving second downlink information, failing to decode a first portion of the second downlink information, detecting a hybrid automatic repeat request (HARQ) buffer unavailability, resetting at least a portion of a HARQ buffer, in response to detecting the HARQ buffer unavailability, by discarding NACK information associated with the NACK, generating a reset NACK indicating the HARQ buffer reset and indicating the NACK information being discarded, and transmitting a second response including the reset NACK to the BS.

Any of the methods above, wherein the NACK information comprises log-likelihood ratio (LLR) associated with the first portion of the first downlink information.

Any of the methods above, wherein transmitting the second response comprises transmitting the second response on one of a plurality of resources scheduled by the BS for responses associated with the first downlink information or the second downlink information.

Any of the methods above, wherein transmitting the second response comprises transmitting an indication associated with updating a first content of the first response with a second content of the second response.

Any of the methods above, wherein transmitting the second response comprises transmitting an indication associated with updating a first content, of the first response, associated with the NACK with a second content, of the second response, associated with the reset NACK.

Any of the methods above, wherein the first response includes additional information associated with the first downlink information other than the NACK, and the second response includes the additional information.

Any of the methods above, further comprising transmitting, in response to detecting the HARQ buffer unavailability, a scheduling request (SR) to the BS to allocate resources for the second response, receiving an indication indicating the allocated resources, and wherein transmitting the second response comprises transmitting the second response via the allocated resources.

Any of the methods above, wherein transmitting the second response comprises transmitting the second response on resources allocated for transmissions unassociated with the first downlink information or the second downlink information.

Any of the methods above, wherein transmitting the second response further comprises transmitting an indication associated with updating a first content of the first response with a second content of the second response.

Any of the methods above, wherein transmitting the indication comprises transmitting the indication after a threshold time.

Any of the methods above, wherein transmitting the second response comprises transmitting an indication associated with updating a first content, of the first response, associated with the NACK with a second content, of the second response, associated with the reset NACK.

Any of the methods above, wherein transmitting the indication comprises transmitting the indication after a threshold time.

Any of the methods above, further comprising receiving prior to transmitting the second response, a request from the BS to generate a HARQ response associated with the first downlink information or the second downlink information.

Any of the methods above, wherein the request is indicated in a downlink control indicator (DCI).

Other aspects of the present disclosure include a user equipment (UE) having a memory comprising instructions, a transceiver, and one or more processors operatively coupled with the memory and the transceiver, the one or more processors configured to execute instructions in the memory to receive first downlink information, fail to decode a first portion of the first downlink information, transmit to a base station (BS), a first response including a negative acknowledgement (NACK) indicating a first decoding failure associated with the first portion of the first downlink information, receive second downlink information, fail to decode a first portion of the second downlink information, detect a hybrid automatic repeat request (HARQ) buffer unavailability, reset at least a portion of a HARQ buffer, in response to detecting the HARQ buffer unavailability, by discarding NACK information associated with the NACK, generate a reset NACK indicating the HARQ buffer reset and indicating the NACK information being discarded, and transmit a second response including the reset NACK to the BS.

Any of the UEs above, wherein the NACK information comprises log-likelihood ratio (LLR) associated with the first portion of the first downlink information.

Any of the UEs above, wherein transmitting the second response comprises transmitting the second response on one of a plurality of resources scheduled by the BS for responses associated with the first downlink information or the second downlink information.

Any of the UEs above, wherein transmitting the second response comprises transmitting an indication associated with updating a first content of the first response with a second content of the second response.

Any of the UEs above, wherein transmitting the second response comprises transmitting an indication associated with updating a first content, of the first response, associated with the NACK with a second content, of the second response, associated with the reset NACK.

Any of the UEs above, wherein the first response includes additional information associated with the first downlink information other than the NACK, and the second response includes the additional information.

Any of the UEs above, wherein the one or more processors are further configured to transmit in response to detecting the HARQ buffer unavailability, a scheduling request (SR) to the BS to allocate resources for the second response, receive an indication indicating the allocated resources, and wherein transmitting the second response comprises transmitting the second response via the allocated resources.

Any of the UEs above, wherein transmitting the second response comprises transmitting the second response on resources allocated for transmissions unassociated with the first downlink information or the second downlink information.

Any of the UEs above, wherein transmitting the second response further comprises transmitting an indication associated with updating a first content of the first response with a second content of the second response.

Any of the UEs above, wherein transmitting the indication comprises transmitting the indication after a threshold time.

Any of the UEs above, wherein transmitting the second response comprises transmitting an indication associated with updating a first content, of the first response, associated with the NACK with a second content, of the second response, associated with the reset NACK.

Any of the UEs above, wherein transmitting the indication comprises transmitting the indication after a threshold time.

Any of the UEs above, wherein the one or more processors are further configured to receive prior to transmitting the second response, a request from the BS to generate a HARQ response associated with the first downlink information or the second downlink information.

Any of the UEs above, wherein the request is indicated in a downlink control indicator (DCI).

Any of the UEs above, wherein the one or more processors are further configured to determine to discard the NACK information associated with the NACK.

An aspect of the present disclosure includes a user equipment (UE) including means for receiving first downlink information, means for failing to decode a first portion of the first downlink information, means for transmitting, to a base station (BS), a first response including a negative acknowledgement (NACK) indicating a first decoding failure associated with the first portion of the first downlink information, means for receiving second downlink information, means for failing to decode a first portion of the second downlink information, means for detecting a hybrid automatic repeat request (HARQ) buffer unavailability, means for resetting at least a portion of a HARQ buffer, in response to detecting the HARQ buffer unavailability, by discarding NACK information associated with the NACK, means for generating a reset NACK indicating the HARQ buffer reset and indicating the NACK information being discarded, and means for transmitting a second response including the reset NACK to the BS.

Any of the UEs above, wherein the NACK information comprises log-likelihood ratio (LLR) associated with the first portion of the first downlink information.

Any of the UEs above, wherein means for transmitting the second response comprises means for transmitting the second response on one of a plurality of resources scheduled by the BS for responses associated with the first downlink information or the second downlink information.

Any of the UEs above, wherein means for transmitting the second response comprises means for transmitting an indication associated with updating a first content of the first response with a second content of the second response.

Any of the UEs above, wherein means for transmitting the second response comprises means for transmitting an indication associated with updating a first content, of the first response, associated with the NACK with a second content, of the second response, associated with the reset NACK.

Any of the UEs above, wherein the first response includes additional information associated with the first downlink information other than the NACK, and the second response includes the additional information.

Any of the UEs above, further comprising means for transmitting, in response to detecting the HARQ buffer unavailability, a scheduling request (SR) to the BS to allocate resources for the second response, means for receiving an indication indicating the allocated resources, and wherein transmitting the second response comprises transmitting the second response via the allocated resources.

Any of the UEs above, wherein means for transmitting the second response comprises means for transmitting the second response on resources allocated for transmissions unassociated with the first downlink information or the second downlink information.

Any of the UEs above, wherein means for transmitting the second response further comprises means for transmitting an indication associated with updating a first content of the first response with a second content of the second response.

Any of the UEs above, wherein means for transmitting the indication comprises means for transmitting the indication after a threshold time.

Any of the UEs above, wherein means for transmitting the second response comprises means for transmitting an indication associated with updating a first content, of the first response, associated with the NACK with a second content, of the second response, associated with the reset NACK.

Any of the UEs above, wherein means for transmitting the indication comprises means for transmitting the indication after a threshold time.

Any of the UEs above, further comprising means for receiving prior to transmitting the second response, a request from the BS to generate a HARQ response associated with the first downlink information or the second downlink information.

Any of the UEs above, wherein the request is indicated in a downlink control indicator (DCI).

Any of the UEs above, further comprising means for determining to discard the NACK information associated with the NACK.

Some aspects of the present disclosure include non-transitory computer readable media having instructions stored therein that, when executed by one or more processors of a user equipment (UE), cause the one or more processors to receive first downlink information, fail to decode a first portion of the first downlink information, transmit to a base station (BS), a first response including a negative acknowledgement (NACK) indicating a first decoding failure associated with the first portion of the first downlink information, receive second downlink information, fail to decode a first portion of the second downlink information, detect a hybrid automatic repeat request (HARQ) buffer unavailability, reset at least a portion of a HARQ buffer, in response to detecting the HARQ buffer unavailability, by discarding NACK information associated with the NACK, generate a reset NACK indicating the HARQ buffer reset and indicating the NACK information being discarded, and transmit a second response including the reset NACK to the BS.

Any of the non-transitory computer readable media above, wherein the NACK information comprises log-likelihood ratio (LLR) associated with the first portion of the first downlink information.

Any of the non-transitory computer readable media above, wherein transmitting the second response comprises transmitting the second response on one of a plurality of resources scheduled by the BS for responses associated with the first downlink information or the second downlink information.

Any of the non-transitory computer readable media above, wherein transmitting the second response comprises transmitting an indication associated with updating a first content of the first response with a second content of the second response.

Any of the non-transitory computer readable media above, wherein transmitting the second response comprises transmitting an indication associated with updating a first content, of the first response, associated with the NACK with a second content, of the second response, associated with the reset NACK.

Any of the non-transitory computer readable media above, wherein the first response includes additional information associated with the first downlink information other than the NACK, and the second response includes the additional information.

Any of the non-transitory computer readable media above, further comprising instructions, when executed by the one or more processors, cause the one or more processors to transmit in response to detecting the HARQ buffer unavailability, a scheduling request (SR) to the BS to allocate resources for the second response, receive an indication indicating the allocated resources, and wherein transmitting the second response comprises transmitting the second response via the allocated resources.

Any of the non-transitory computer readable media above, wherein transmitting the second response comprises transmitting the second response on resources allocated for transmissions unassociated with the first downlink information or the second downlink information.

Any of the non-transitory computer readable media above, wherein transmitting the second response further comprises transmitting an indication associated with updating a first content of the first response with a second content of the second response.

Any of the non-transitory computer readable media above, wherein transmitting the indication comprises transmitting the indication after a threshold time.

Any of the non-transitory computer readable media above, wherein transmitting the second response comprises transmitting an indication associated with updating a first content, of the first response, associated with the NACK with a second content, of the second response, associated with the reset NACK.

Any of the non-transitory computer readable media above, wherein transmitting the indication comprises transmitting the indication after a threshold time.

Any of the non-transitory computer readable media above, further comprising instructions, when executed by the one or more processors, cause the one or more processors to receive prior to transmitting the second response, a request from the BS to generate a HARQ response associated with the first downlink information or the second downlink information.

Any of the non-transitory computer readable media above, wherein the request is indicated in a downlink control indicator (DCI).

Any of the non-transitory computer readable media above, further comprising instructions, when executed by the one or more processors, cause the one or more processors to determine to discard the NACK information associated with the NACK.

Aspects of the present disclosure include methods by a base station (BS) for transmitting, to a user equipment (UE), first downlink information, receiving, from the UE in response to transmitting the downlink information, a first response including a negative acknowledgement (NACK) indicating a first decoding failure associated with a first portion of the first downlink information, transmitting, to the UE, second downlink information, and receiving, from the UE in response to transmitting the second downlink information, a second response including a reset NACK indicating a hybrid automatic repeat request (HARQ) buffer reset and the UE discarding NACK information associated with the NACK, wherein the HARQ buffer reset is associated with a HARQ buffer unavailability.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. For example, changes may be made in the function and arrangement of elements discussed without departing from the scope of the disclosure. Also, various examples may omit, substitute, or add various procedures or components as appropriate. For instance, the methods described may be performed in an order different from that described, and various steps may be added, omitted, or combined. Also, features described with respect to some examples may be combined in other examples. In some instances, well-known structures and apparatuses are shown in block diagram form in order to avoid obscuring the concepts of the described examples.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP LTE and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description herein, however, describes an LTE/LTE-A system or 5G system for purposes of example, and LTE terminology is used in much of the description below, although the techniques may be applicable other next generation communication systems.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above may be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that may be accessed by a general purpose or special purpose computer. By way of example, and not limitation, computer-readable media may comprise RAM, ROM, EEPROM, CD-ROM or other optical disk storage, magnetic disk storage or other magnetic storage devices, or any other medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise. Thus, the disclosure is not to be limited to the examples and designs described herein but is to be accorded the widest scope consistent with the principles and novel features disclosed herein.

What is claimed is:

1. A method of wireless communication by a user equipment (UE) in a network, comprising:
receiving first downlink information;
failing to decode a first portion of the first downlink information;
transmitting, to a base station (BS), a first response including a negative acknowledgement (NACK) indicating a first decoding failure associated with the first portion of the first downlink information;
receiving second downlink information;
failing to decode a first portion of the second downlink information;
detecting a hybrid automatic repeat request (HARQ) buffer unavailability;
resetting at least a portion of a HARQ buffer, in response to detecting the HARQ buffer unavailability, by discarding NACK information associated with the NACK;
generating a reset NACK indicating the HARQ buffer reset and indicating the NACK information being discarded; and
transmitting a second response including the reset NACK to the BS.

2. The method of claim 1, wherein:
the NACK information comprises log-likelihood ratio (LLR) associated with the first portion of the first downlink information.

3. The method of claim 1, wherein:
transmitting the second response comprises transmitting the second response on one of a plurality of resources scheduled by the BS for responses associated with the first downlink information or the second downlink information.

4. The method of claim 3, wherein:
transmitting the second response comprises transmitting an indication associated with updating a first content of the first response with a second content of the second response.

5. The method of claim 3, wherein:
transmitting the second response comprises transmitting an indication associated with updating a first content, of the first response, associated with the NACK with a second content, of the second response, associated with the reset NACK.

6. The method of claim 5, wherein:
the first response includes additional information associated with the first downlink information other than the NACK; and
the second response includes the additional information.

7. The method of claim 1, further comprising:
transmitting, in response to detecting the HARQ buffer unavailability, a scheduling request (SR) to the BS to allocate resources for the second response;
receiving an indication indicating the allocated resources; and
wherein transmitting the second response comprises transmitting the second response via the allocated resources.

8. The method of claim 1, wherein:
transmitting the second response comprises transmitting the second response on resources allocated for transmissions unassociated with the first downlink information or the second downlink information.

9. The method of claim 8, wherein:
transmitting the second response further comprises transmitting an indication associated with updating a first content of the first response with a second content of the second response.

10. The method of claim 9, wherein:
transmitting the indication comprises transmitting the indication after a threshold time.

11. The method of claim 8, wherein:
transmitting the second response comprises transmitting an indication associated with updating a first content, of the first response, associated with the NACK with a second content, of the second response, associated with the reset NACK.

12. The method of claim 11, wherein:
transmitting the indication comprises transmitting the indication after a threshold time.

13. The method of claim 8, further comprising:
receiving prior to transmitting the second response, a request from the BS to generate a HARQ response associated with the first downlink information or the second downlink information.

14. The method of claim 13, wherein:
the request is indicated in a downlink control indicator (DCI).

15. The method of claim 1, further comprising:
determining to discard the NACK information associated with the NACK.

16. A user equipment (UE), comprising:
a memory comprising instructions;
a transceiver; and
one or more processors operatively coupled with the memory and the transceiver, the one or more processors configured to execute instructions in the memory to:
receive, via the transceiver, first downlink information;
fail to decode a first portion of the first downlink information;
transmit, via the transceiver, to a base station (BS), a first response including a negative acknowledgement (NACK) indicating a first decoding failure associated with the first portion of the first downlink information;
receive, via the transceiver, second downlink information;
fail to decode a first portion of the second downlink information;
detect a hybrid automatic repeat request (HARQ) buffer unavailability;
reset at least a portion of a HARQ buffer, in response to detecting the HARQ buffer unavailability, by discarding NACK information associated with the NACK;
generate a reset NACK indicating the HARQ buffer reset and indicating the NACK information being discarded; and
transmit, via the transceiver, a second response including the reset NACK to the BS.

17. The UE of claim 16, wherein:
the NACK information comprises log-likelihood ratio (LLR) associated with the first portion of the first downlink information.

18. The UE of claim 16, wherein the one or more processors are further configured to:
transmit, via the transceiver, the second response on one of a plurality of resources scheduled by the BS for responses associated with the first downlink information or the second downlink information.

19. The UE of claim 18, wherein the one or more processors are further configured to:
transmit, via the transceiver, an indication associated with updating a first content of the first response with a second content of the second response.

20. The UE of claim 18, wherein the one or more processors are further configured to:
transmit, via the transceiver, an indication associated with updating a first content, of the first response, associated with the NACK with a second content, of the second response, associated with the reset NACK.

21. The UE of claim 20, wherein:
the first response includes additional information associated with the first downlink information other than the NACK; and
the second response includes the additional information.

22. The UE of claim 16, wherein the one or more processors are further configured to:
transmit, via the transceiver, in response to detecting the HARQ buffer unavailability, a scheduling request (SR) to the BS to allocate resources for the second response;
receive, via the transceiver, an indication indicating the allocated resources; and
wherein transmitting the second response comprises transmitting, via the transceiver, the second response via the allocated resources.

23. The UE of claim 16, wherein the one or more processors are further configured to:
transmit, via the transceiver, the second response on resources allocated for transmissions unassociated with the first downlink information or the second downlink information.

24. The UE of claim 23, wherein the one or more processors are further configured to:
transmit, via the transceiver, an indication associated with updating a first content of the first response with a second content of the second response.

25. The UE of claim 24, wherein the one or more processors are further configured to:
   transmit, via the transceiver, the indication after a threshold time.

26. The UE of claim 23, wherein the one or more processors are further configured to:
   transmit, via the transceiver, an indication associated with updating a first content, of the first response, associated with the NACK with a second content, of the second response, associated with the reset NACK.

27. The UE of claim 26, wherein the one or more processors are further configured to:
   transmit, via the transceiver, the indication after a threshold time.

28. The UE of claim 23, wherein the one or more processors are further configured to:
   receive, via the transceiver, prior to transmitting the second response, a request from the BS to generate a HARQ response associated with the first downlink information or the second downlink information.

29. A non-transitory computer readable medium having instructions stored therein that, when executed by one or more processors of a user equipment (UE), cause the one or more processors to:
   receive first downlink information;
   fail to decode a first portion of the first downlink information;
   transmit to a base station (BS), a first response including a negative acknowledgement (NACK) indicating a first decoding failure associated with the first portion of the first downlink information;
   receive second downlink information;
   fail to decode a first portion of the second downlink information;
   detect a hybrid automatic repeat request (HARQ) buffer unavailability;
   reset at least a portion of a HARQ buffer, in response to detecting the HARQ buffer unavailability, by discarding NACK information associated with the NACK;
   generate a reset NACK indicating the HARQ buffer reset and indicating the NACK information being discarded; and
   transmit a second response including the reset NACK to the BS.

30. A user equipment (UE), comprising:
   means for receiving first downlink information;
   means for failing to decode a first portion of the first downlink information;
   means for transmitting, to a base station (BS), a first response including a negative acknowledgement (NACK) indicating a first decoding failure associated with the first portion of the first downlink information;
   means for receiving second downlink information;
   means for failing to decode a first portion of the second downlink information;
   means for detecting a hybrid automatic repeat request (HARQ) buffer unavailability;
   means for resetting at least a portion of a HARQ buffer, in response to detecting the HARQ buffer unavailability, by discarding NACK information associated with the NACK;
   means for generating a reset NACK indicating the HARQ buffer reset and indicating the NACK information being discarded; and
   means for transmitting a second response including the reset NACK to the BS.

* * * * *